US012736889B2

(12) United States Patent
Kototani et al.

(10) Patent No.: US 12,736,889 B2
(45) Date of Patent: Sep. 15, 2026

(54) TONER

(71) Applicant: CANON KABUSHIKI KAISHA, Tokyo (JP)

(72) Inventors: Shohei Kototani, Shizuoka (JP); Takashi Kenmoku, Shizuoka (JP); Yoshiaki Shiotari, Shizuoka (JP); Mayumi Inoue, Kanagawa (JP); Kozue Uratani, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 501 days.

(21) Appl. No.: 18/350,331

(22) Filed: Jul. 11, 2023

(65) Prior Publication Data

US 2024/0027930 A1 Jan. 25, 2024

(30) Foreign Application Priority Data

Jul. 15, 2022 (JP) ................................ 2022-113832

(51) Int. Cl.
*G03G 9/08* (2006.01)
*C08F 8/42* (2006.01)
(Continued)

(52) U.S. Cl.
CPC ............. *G03G 9/0825* (2013.01); *C08F 8/42* (2013.01); *C08F 220/1804* (2020.02); *G03G 9/08791* (2013.01); *G03G 9/09733* (2013.01)

(58) Field of Classification Search
CPC ............. G03G 9/0825; G03G 9/08791; G03G 9/09733; C08F 220/1804; C08F 8/42
See application file for complete search history.

(56) References Cited

U.S. PATENT DOCUMENTS 7,393,912 B2 7/2008 Mihara
7,399,568 B2 7/2008 Fuku
(Continued)

FOREIGN PATENT DOCUMENTS

JP 9-114134 A 5/1997
JP 9-179341 A 7/1997
(Continued)

OTHER PUBLICATIONS

Robert F. Fedors, A Method for Estimating Both the Solubility Parameters and Molar Volumes of Liquids, Polymer Engineering and Science, vol. 14, No. 2, 147-154,1974.
(Continued)

*Primary Examiner* — Mark F. Huff
*Assistant Examiner* — Boone Alexander Evans
(74) *Attorney, Agent, or Firm* — VENABLE LLP

(57) ABSTRACT

A toner comprising a toner particle, the toner particle comprising: a binder resin and a wax; wherein the toner particle has a toner core particle and a protrusion present on the surface of the toner core particle, the protrusion comprises an organosilicon polymer, where in cross-sectional observation of the toner particle, a line segment connecting both ends of an interface between the toner core particle and the protrusion is defined as a reference line, and the length of the reference line is denoted by W (nm), and a maximum length of the protrusion in the toner core particle direction from the reference line in the normal direction of the reference line is defined as a maximum penetration depth I (nm), W and I satisfy I/W≤0.050, and Young's modulus of the protrusion E1 is 1.00 to 3.90 GPa.

10 Claims, 4 Drawing Sheets

(51) Int. Cl.

| | |
|---|---|
| ***C08F 220/18*** | (2006.01) |
| ***G03G 9/087*** | (2006.01) |
| ***G03G 9/097*** | (2006.01) |

(56) References Cited

U.S. PATENT DOCUMENTS 7,452,960 B2 11/2008 Yano
7,510,813 B2 3/2009 Yano
7,638,194 B2 12/2009 Fukui
7,638,590 B2 12/2009 Fukui
7,682,765 B2 3/2010 Sugawa
7,795,363 B2 9/2010 Fukui
7,811,735 B2 10/2010 Nakamura et al.
7,935,771 B2 5/2011 Fukui
8,067,136 B2 11/2011 Yano
8,110,329 B2 2/2012 Tominaga
8,178,271 B2 5/2012 Fukui
8,288,069 B2 10/2012 Fujikawa
8,323,726 B2 12/2012 Naka
8,367,289 B2 2/2013 Isono
8,383,312 B2 2/2013 Fujimoto
8,440,382 B2 5/2013 Isono
8,497,054 B2 7/2013 Sugiyama
8,574,801 B2 11/2013 Itabashi
8,609,312 B2 12/2013 Itabashi
8,652,737 B2 2/2014 Handa
8,778,581 B2 7/2014 Nonaka
8,828,633 B2 9/2014 Itabashi
8,918,035 B2 12/2014 Hasegawa
8,986,914 B2 3/2015 Fujikawa
9,029,056 B2 5/2015 Kenmoku
9,034,549 B2 5/2015 Shiotari
9,098,002 B2 8/2015 Kenmoku
9,098,003 B2 8/2015 Masumoto
9,158,216 B2 10/2015 Shimano
9,244,371 B2 1/2016 Suzumura
9,256,148 B2 2/2016 Fujikawa
9,261,806 B2 2/2016 Moribe
9,285,697 B2 3/2016 Fukudome
9,304,422 B2 4/2016 Matsui
9,348,246 B2 5/2016 Magome
9,354,545 B2 5/2016 Matsui
9,377,705 B2 6/2016 Shimano
9,377,708 B2 6/2016 Magome
9,383,668 B2 7/2016 Noji
9,423,711 B2 8/2016 Uratani
9,423,714 B2 8/2016 Kenmoku
9,442,416 B2 9/2016 Magome
9,500,972 B2 11/2016 Tanaka
9,575,424 B2 2/2017 Nakagawa
9,594,323 B2 3/2017 Fujikawa
9,599,919 B2 3/2017 Isono
9,625,842 B2 4/2017 Uratani
9,658,546 B2 5/2017 Tanaka
9,658,549 B2 5/2017 Tanaka
9,785,071 B2 10/2017 Shimano
9,804,514 B2 10/2017 Suzumura
9,829,816 B2 11/2017 Tanaka
9,835,964 B2 12/2017 Yoshida
9,841,692 B2 12/2017 Hasegawa
9,857,707 B2 1/2018 Tsuda
9,880,478 B2 1/2018 Shimano
9,904,193 B2 2/2018 Nakagawa
9,958,801 B2 5/2018 Tanaka
9,964,874 B2 5/2018 Suzumura
10,054,866 B2 8/2018 Tanaka
10,078,279 B2 9/2018 Nakagawa
10,101,681 B2 10/2018 Tagawa
10,114,303 B2 10/2018 Katsura
10,216,107 B2 2/2019 Tsubaki
10,228,627 B2 3/2019 Nagashima
10,310,397 B2 6/2019 Sano
10,545,420 B2 1/2020 Kinumatsu
10,578,990 B2 3/2020 Tsuda
10,678,155 B2 6/2020 Terui
10,698,327 B2 6/2020 Nagashima
10,747,133 B2 8/2020 Ya
10,747,136 B2 8/2020 Kenmoku
10,782,623 B2 9/2020 Yoshiba
10,942,465 B2 3/2021 Kototani
10,942,466 B2 3/2021 Tominaga
10,948,839 B2 3/2021 Tsubaki
10,976,678 B2 4/2021 Yamawaki
10,976,679 B2 4/2021 Tanaka
11,003,104 B2 5/2021 Katsura
11,003,105 B2 5/2021 Sato
11,086,242 B2 8/2021 Isono
11,112,708 B2 9/2021 Uratani
11,169,458 B2 11/2021 Toyoizumi
11,169,460 B2 11/2021 Kototani
11,175,600 B2 11/2021 Uchiyama
11,181,845 B2 11/2021 Shimoda
11,249,412 B2 2/2022 Kawamura
11,256,187 B2 2/2022 Ogaki
11,314,178 B2 4/2022 Kenmoku
11,347,157 B2 5/2022 Kamikura
11,397,386 B2 7/2022 Kyuushima
11,531,282 B2 12/2022 Kamikura
11,714,363 B2 8/2023 Ookubo
2012/0328979 A1 12/2012 Yoshizaki
2013/0011774 A1* 1/2013 Kamiwaki ......... G03G 9/08797 430/108.1
2015/0099222 A1* 4/2015 Terui .................... G03G 9/0825 430/109.3
2020/0026208 A1 1/2020 Terui
2020/0124998 A1 4/2020 Kototani
2020/0209771 A1* 7/2020 Hashimoto .......... G03G 9/0825
2020/0292955 A1* 9/2020 Matsunaga .......... G03G 9/0825
2020/0341400 A1* 10/2020 Shimoda ............ G03G 9/08782
2021/0026265 A1* 1/2021 Kamikura .......... G03G 9/09791
2021/0223731 A1 7/2021 Suzuki et al.
2021/0311405 A1 10/2021 Shiotari
2021/0318630 A1 10/2021 Terui
2021/0318631 A1 10/2021 Isono
2022/0075284 A1 3/2022 Nakayama
2022/0128915 A1 4/2022 Toyoda
2022/0128916 A1 4/2022 Yoshida
2022/0128918 A1 4/2022 Kototani
2022/0128919 A1 4/2022 Kawamura
2022/0146952 A1 5/2022 Komiya
2022/0146953 A1 5/2022 Kyuushima
2022/0146954 A1 5/2022 Kato
2022/0146955 A1 5/2022 Nozaki
2022/0206402 A1 6/2022 Uratani
2022/0214629 A1 7/2022 Kenmoku
2022/0214630 A1 7/2022 Kamikura
2022/0390870 A1 12/2022 Kyuushima
2022/0390871 A1 12/2022 Isono
2022/0397836 A1 12/2022 Toyoda
2022/0404730 A1 12/2022 Nagaoka
2022/0413407 A1 12/2022 Inoue
2023/0080900 A1 3/2023 Kamikura
2023/0114583 A1 4/2023 Kenmoku
2023/0116451 A1 4/2023 Uratani
2023/0117448 A1 4/2023 Fukudome
2023/0119795 A1 4/2023 Saeki
2023/0161277 A1 5/2023 Komiya

FOREIGN PATENT DOCUMENTS

JP 2008-9211 A 1/2008
JP 2011-227498 A 11/2011
JP 2015-96948 A 5/2015
JP 2019-86641 A 6/2019
JP 2020-12943 A 1/2020
JP 2020-64254 A 4/2020
JP 2020-154292 A 9/2020
JP 2020-181187 A 11/2020
JP 2021-18335 A 2/2021
JP 2021-113861 A 8/2021
JP 2021-167896 A 10/2021
JP 2022-25866 A 2/2022

(56) References Cited

FOREIGN PATENT DOCUMENTS

| | | |
|---|---|---|
| JP | 2022-69321 A | 5/2022 |
| JP | 2022-92582 A | 6/2022 |

OTHER PUBLICATIONS

U.S. Appl. No. 18/321,312, Keisuke Adachi, filed May 22, 2023.
U.S. Appl. No. 18/327,506, Masaya Komuro, filed Jun. 1, 2023.
U.S. Appl. No. 18/350,248, Yoshiaki Shiotari, filed Jul. 11, 2023.
U.S. Appl. No. 18/350,260, Kenji Ookubo, filed Jul. 11, 2023.
U.S. Appl. No. 18/350,266, Mayumi Inoue, filed Jul. 11, 2023.
U.S. Appl. No. 18/350,309, Naoya Isono, filed Jul. 11, 2023.
U.S. Appl. No. 18/354,776, Shohei Kototani, filed Jul. 19, 2023.

* cited by examiner

TONER

BACKGROUND OF THE INVENTION

Field of the Invention

The present disclosure relates to a toner for use in recording methods utilizing electrophotography, electrostatic recording, and toner jet recording.

Description of the Related Art

A method of visualizing image information via an electrostatic latent image, such as electrophotography, has been applied to copiers, multifunction machines, and printers. The diversification of intensions of use and usage environments in recent years created a demand for further increase in speed and extension of service life. As an adverse effect on the toner due to such increase in speed of the electrophotographic process and extension of service life, the toner is subjected to more stress than before due to rubbing by members of an image forming apparatus. This results in accelerated deterioration of the toner, such as deformation of the toner and embedding of external additives.

Conventionally, methods of coating the toner surface with inorganic fine particles such as small-diameter silica have been widely used to control the charging characteristics of the toner, primarily the charge quantity. Meanwhile, it has been pointed out that these methods tend to cause deterioration of the toner due to migration of inorganic fine particles to members or embedding in the toner, and there is room for improvement in charging stability throughout the service life.

To resolve this problem, Japanese Patent Application Publication No. 2020-181187 discloses a toner in which organosilicon polymer particles are fixedly attached to the toner surface, thereby improving flowability and improving charging performance throughout the service life of the toner.

Japanese Patent Application Publication No. 2021-018335 discloses a toner in which a core using a silane-modified resin is coated with an organosilicon polymer, thereby improving charging performance.

Meanwhile, toner deterioration can be effectively suppressed by reducing a load on the toner from members. Accordingly, the reduction of load of the electrophotographic process has been studied. However, load reduction in the electrophotographic process reduces chances of charging the toner. Therefore, there is a problem that the charge rising speed and the charge quantity of the toner are decreased.

Furthermore, with the worldwide spread of electrophotography, there is a demand for a toner that can ensure a sufficient charge quantity even in a high-humidity environment, which is disadvantageous to charging performance. In a high-humidity environment, it is difficult to improve the charge quantity of the toner due to the influence of the amount of moisture in the air. In addition, the broadening of charge distribution and a decrease in a charge retention property caused by a charge leakage are likely to occur as well. There is also an electrophotographic process (hereinafter referred to as a two-step transfer system) that has two transfer steps: primary transfer in which transfer is performed from a photosensitive member to an intermediate transfer belt, and secondary transfer in which transfer is performed from the intermediate transfer belt to paper. In particular, a problem that is likely to arise in such an electrophotographic process involving a long process up to printing is that the charge quantity of the toner tends to decrease.

With such a toner with a reduced charge quantity, a force received from the electrostatic electric field in the transfer process is reduced, so the electrostatic force that causes the toner to fly onto the paper is reduced. As a result, some of the toner is not transferred to the paper because the flying of the toner is hindered. In particular, some small dots are missing, resulting in image unevenness in halftone images, which sometimes makes it impossible to obtain high-definition images.

Therefore, there is a demand for a toner that has a high charge quantity and that can maintain such high charge quantity throughout a series of electrophotographic processes, thereby making it possible to reproduce even minute dots, even in a high-speed and light-load process in a high-humidity environment.

Thus, in order to obtain a high-definition image even in a light-load process in a high-humidity environment, it is important to ensure a high charge quantity even in a light-load process and to maintain the desired charge quantity through a series of electrophotographic processes until transfer onto paper.

However, studies by the present inventors have demonstrated that the toner described in Japanese Patent Application Publication No. 2020-181187 may not have a sufficient charge quantity in a light-load process, and there is still room for improvement in charge characteristics.

It was also found that the toner described in Japanese Patent Application Publication No. 2021-018335 does not necessarily have sufficient charge quantity and charge holding property in a series of electrophotographic processes in a light-load process under high-temperature and high-humidity conditions. As a result, in the process of transferring to paper, toner with a low charge quantity is generated, so that transfer from the intermediate transfer belt to paper is not performed as desired, and fine dots cannot be reproduced in some cases.

It is believed that these results are due to the difficulty of ensuring a high charge quantity, especially in a light-load process in a high-temperature and high-humidity environment.

SUMMARY OF THE INVENTION

In view of these problems, the present disclosure provides a toner that makes it possible to obtain high-definition images with high reproducibility of fine dots as a result of having a high charge quantity and charge retention property through a series of electrophotographic processes even in a light-load process under high-temperature and high-humidity conditions.

The present disclosure relates to a toner comprising a toner particle, the toner particle comprising:

a binder resin and a wax; wherein the toner particle has a toner core particle and a protrusion present on the surface of the toner core particle, the protrusion comprises an organosilicon polymer, where in a horizontal image obtained in cross-sectional observation of the toner particle with a transmission electron microscope by drawing a line along a circumference of the surface of the toner core particle and converting based on the line along the circumference, a line segment connecting both ends of an interface between the toner core particle and the protrusion is defined as a reference line, and the length of the reference line is denoted by W (nm), and a maximum length of the protrusion in the toner core particle direction from the reference line in the normal direction of the reference line is defined as a maximum penetration depth I (nm), W and I satisfy formula (1), $$I/W \leq 0.050 \quad (1)$$

and where a Young's modulus of the protrusion calculated by Hertz's contact theory is denoted by E1, E1 is 1.00 to 3.90 GPa.

According to the present disclosure, a toner can be provided that makes it possible to obtain high-definition images with high reproducibility of fine dots as a result of having a high charge quantity and charge retention property through a series of electrophotographic processes even in a light-load process under high-temperature and high-humidity conditions.

Further features of the present invention will become apparent from the following description of exemplary embodiments with reference to the attached drawings.

DESCRIPTION OF THE EMBODIMENTS

Figure 1:
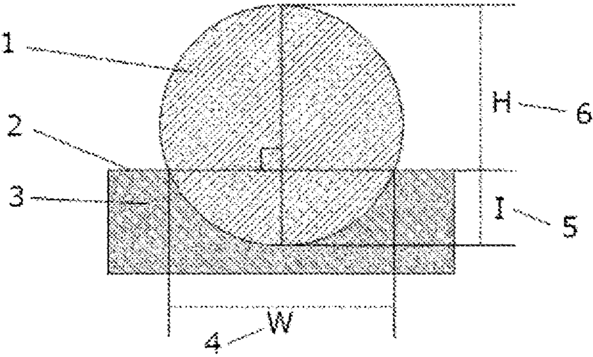
FIG. 1 is a schematic diagram illustrating a case in which a particle penetrates into toner.

In the present disclosure, the wordings "from XX to YY" and "XX to YY" expressing numerical value ranges mean numerical value ranges including the lower limit and the upper limit as endpoints, unless otherwise stated. When numerical value ranges are described stepwise, upper limits and lower limits of those numerical value ranges can be combined suitably.

The term "monomer unit" refers to a reacted form of a monomer material included in a polymer. For example, a section including a carbon-carbon bond in a main chain of a polymer formed through polymerization of a vinyl monomer will be referred to as a single unit. A vinyl monomer can be represented by the following formula (Z).

(Z)

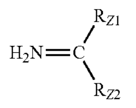

In the formula (Z), $R_{Z1}$ represents a hydrogen atom or an alkyl group (preferably, an alkyl group having 1 to 3 carbon atoms, and more preferably a methyl group), and $R_{Z2}$ represents any substituent.

As a means for improving the charge quantity in normal triboelectric charging, an increase in frictional force, a decrease in humidity, an increase in contact area, and an increase in chances of contact can be considered. As a method for increasing the frictional force, for example, it is possible to increase the contact pressure between a member that carries toner (hereinafter referred to as a carrying member) and a regulating member responsible for regulating the thickness of the toner layer and performing triboelectric charging according to the regulation (hereinafter referred to as a regulating member). Another method is to increase the contact area between the carrying member and the regulating member.

According to these methods, the frictional force, the contact area, and the chances of contact between the toner and the regulating member (hereinafter referred to as toner-to-regulating member) and between the toner particles (hereinafter referred to as toner-to-toner) can be improved, so that the charge quantity of the toner can be improved. However, methods of increasing the contact pressure and contact area by means of members, such as these methods, increase the load on the toner.

As a result, the deterioration of the toner, such as the embedding of external additives and the deformation of the toner particles themselves, may be accelerated. Therefore, when aiming at an electrophotographic process with a longer service life, there is a demand for a toner that can ensure a sufficient charge quantity even in a process in which the load of these members is reduced.

As mentioned hereinabove, when adapting to a light-load process under high humidity is premised, it is not possible to adopt a means for increasing the toner-to-regulating member frictional force in order to achieve a light-load process. In addition, humidity cannot be controlled because the use in various environments such as high-humidity environments is premised. Accordingly, the present inventors have investigated a method of improving the contact area between the toner and the regulating member or the toner-to-toner contact area as means for ensuring the charge quantity.

However, although a simple increase in the contact area can ensure the charge quantity, the charge quantity tends to decrease quickly, leading to a decrease in charge retention property. This is because the increase in the contact area promotes the transfer of charges at the time of toner-to-member or toner-to-toner contact, which easily leads to charge leakage. Therefore, charge leakage occurs from the toner in the electrophotographic process downstream of a charging unit such as on the photosensitive member or the intermediate transfer belt. Due to this problem, it is difficult to achieve both a high charge quantity and charge retention property throughout the electrophotographic process, particularly in an electrophotographic process such as a two-step transfer system under a high-humidity environment.

In order to overcome this phenomenon, the present inventors intensively investigated how to increase the contact area during charging in a light-load process in a high-humidity environment, and how to decrease the contact area to maintain the charge quantity in a high-humidity environment.

As a result of studies by the present inventors, it was found that the following toner can provide a toner that has excellent charging characteristics even in a light-load process under high-temperature and high-humidity conditions and that can achieve high image quality.

Thus, the present disclosure relates to a toner comprising a toner particle, the toner particle comprising:

a binder resin and a wax; wherein the toner particle has a toner core particle and a protrusion present on the surface of the toner core particle, the protrusion comprises an organosilicon polymer, where in a horizontal image obtained in cross-sectional observation of the toner particle with a transmission electron microscope by drawing a line along a circumference of the surface of the toner core particle and converting based on the line along the circumference, a line segment connecting both ends of an interface between the toner core particle and the protrusion is defined as a reference line, and the length of the reference line is denoted by W (nm), and a maximum length of the protrusion in the toner core particle direction from the reference line in the normal direction of the reference line is defined as a maximum penetration depth I (nm), W and I satisfy formula (1), $$I/W \leq 0.050 \quad (1)$$

and where a Young's modulus of the protrusion calculated by Hertz's contact theory is denoted by E1, E1 is 1.00 to 3.90 GPa.

The inventors considered that the above results are due to the following mechanism.

In the above toner, protrusions are formed on the toner core particle surface by an organosilicon polymer (condensation product of an organosilicon compound) that is easily negatively charged, assuming that the toner is negatively charged. The protrusions have an appropriate Young's modulus E1 in a process accompanied by pressurization, such as triboelectric charging. This appropriate Young's modulus allows the protrusions to deform elastically when receiving pressure from the regulating member.

As a result, the protrusions are pressurized only during triboelectric charging and deform according to the triboelectric charging member, so that the contact area is greatly increased. As a result, charge transfer from the triboelectric charging member to the toner and charge exchange between toner particles are efficiently performed, thereby increasing the charge quantity and achieving uniform charging of the toner.

Meanwhile, in a non-pressurization process such as on the photosensitive member or the intermediate transfer belt, the protrusions do not deform, so the protrusions act as a toner-to-member or toner-to-toner spacer and play the role of reducing the contact area. The present inventors presume that this makes it possible to inhibit the toner-to-member or toner-to-toner charge transfer, thereby maintaining a high charge quantity.

In order to exhibit this characteristic, the Young's modulus E1 of the protrusions calculated by Hertz's contact theory needs to be from 1.00 GPa to 3.90 GPa. Further, E1 is preferably from 1.20 GPa to 3.60 GPa, more preferably from 2.00 GPa to 3.00 GPa.

Where E1 is less than 1.00 GPa, the protrusions are likely to deform, making it difficult for the protrusions to function as spacers and resulting in reduced charge retention property. Meanwhile, when E1 exceeds 3.90 GPa, it is difficult to deform the protrusions, and thus the charge quantity is difficult to increase.

Furthermore, a horizontal image is obtained in cross-sectional observation of the toner particle with a transmission electron microscope by drawing a line along a circumference of the toner core particle surface and converting based on the line along the circumference. In the horizontal image, a line segment connecting both ends of the interface between the toner core particle and the protrusion is defined as a reference line, and the length of the reference line is denoted by W (nm). Further, the maximum length of the protrusion in the toner core particle direction from the reference line in the direction normal to the reference line is defined as the maximum penetration depth I (nm). At this time, the W and the I satisfy the following formula (1).

$$I/W \leq 0.050 \quad (1)$$

Where the above formula (1) is satisfied, it indicates that the protrusion of the organosilicon polymer are in surface contact with the toner core particle. Therefore, the pressure associated with the deformation of the protrusions when pressurized is evenly applied to the ground surface of the toner core particle. It is believed that this facilitates the charge transfer from the protrusions to the toner core particle, thereby further improving the charge quantity. As a result, dot reproducibility is also improved.

Where I/W is larger than the above range, the effect of improving the charge quantity cannot be obtained. This presumably means that the protrusions have excessively penetrated into the toner core particle, so that the deformation of the protrusions is inhibited by the pressure from the surrounding toner core particles. I/W needs to be 0.050 or less.

From the viewpoint of charge retention property in long-term use, I/W is preferably 0.030 or less, more preferably 0.020 or less, and even more preferably 0.010 or less. The lower limit is not particularly limited but is preferably 0.000 or more, or 0.002 or more. For example, preferably from 0.000 to 0.030, from 0.000 to 0.020, from 0.000 to 0.010, and from 0.002 to 0.010.

A production method called a sol-gel method can be used as a means for forming protrusions of an organosilicon polymer. It is generally known that in a sol-gel reaction, the bonding state of generated siloxane bonds varies depending on the acidity of a reaction medium. Specifically, when the medium is acidic, a hydrogen ion is electrophilically added to the oxygen of one reactive group (for example, alkoxy group: —OR group).

Next, the oxygen atom in a water molecule coordinates to a silicon atom, and a hydrosilyl group is formed through a substitution reaction. When water is sufficiently present, one $H^+$ will attack one oxygen of the reactive group (for example, alkoxy group: —OR group), so when the content ratio of $H^+$ in the medium is low, the substitution reaction to the hydroxy group slows down. Therefore, a condensation polymerization reaction occurs before all the reactive groups attached to the silane are hydrolyzed, and a one-dimensional linear polymer or a two-dimensional polymer tends to be produced relatively easily.

Meanwhile, where the medium is alkaline, hydroxide ions are added to silicon forming a pentacoordinated intermediate. As a result, all reactive groups (for example, alkoxy group: —OR group) are easily detached and easily substituted with silanol groups. In particular, when a silicon compound having three or more reactive groups in the same silane is used, hydrolysis and polycondensation occur three-dimensionally, forming an organosilicon polymer with many three-dimensional crosslinks. Also, the reaction is completed in a short time.

In addition, the sol-gel method starts from a solution and forms materials by gelling the solution, so various microstructures and shapes can be created. In particular, when toner particles are produced in an aqueous medium, because of hydrophilicity due to hydrophilic groups such as silanol groups of the organosilicon compounds, the compound is likely to be present on the toner core particle surface.

Therefore, in order to form protrusions derived from an organosilicon polymer having desired elasticity, it is preferable to carry out the sol-gel reaction in a state with an alkaline reaction medium. Specifically, where toner particles are produced in an aqueous medium, it is preferable to carry out the reaction at a pH of 8.0 or higher, a reaction temperature of 50° C. or higher, and a reaction time of 5 h or longer.

Means for adjusting the protrusion to a specific Young's modulus range are not particularly limited. For example, it is possible to change the type of the organosilicon compound, to use a method of forming the protrusions after surface-treating the toner core particle surface in advance with a small amount of the organosilicon compound, to adjust the condensation method of the organosilicon compound by the pH, concentration, temperature, time, etc., when forming the protrusions, and the like.

As a more specific example, there is a method in which the difference in the condensation reaction rate of the organosilicon compound between weak alkaline and strong alkaline conditions is used while carrying out the sol-gel reaction in an alkaline state as described above. The term "weakly alkaline", as used herein, refers to about pH 7.8 to pH 9.5 (more preferably about pH 8.0 to 8.5), and the term "strongly alkaline" refers to about pH 10.0 to pH 12.0. The present inventors presume that the reason why E1 can be controlled by these methods is that the degree of condensation of the condensation product of the organosilicon compound inside the protrusions or on the surface portion can be adjusted locally.

For example, there is a method in which the reaction is carried out in weak alkalinity for about 1 min to 60 min (preferably 5 min to 20 min), then adjustment is performed to strong alkalinity and the reaction is carried out for about 1 h to 5 h (preferably 2 h to 4 h).

At this time, E1 can be increased, for example, by lengthening the reaction time in weak alkalinity. Also, E1 can be reduced by shortening the reaction time in weak alkalinity.

Meanwhile, I/W can be controlled by adjusting the shape of the protrusion. Specifically, I/W can be increased by increasing I or decreasing W by the methods described hereinbelow. Similarly, by decreasing I or increasing W, I/W can be decreased.

Also, in order to increase I, there is a method for creating protrusions by preparing an organosilicon polymer in spherical shapes in advance and embedding the spheres in a toner core particle by applying an external force or heat from the normal direction. I can be reduced by a method of forming an organosilicon polymer in an aqueous system in which toner core particles are dispersed and fixedly attaching the organosilicon polymer to the surface of the toner core particles.

In addition, W can be controlled by adjusting, as appropriate, the pH during the reaction and the holding time of the pH.

Where the Young's modulus of the surface of the toner core particle is E2, a value of the ratio of E1 to E2 (Young's modulus ratio E1/E2) is preferably from 1.0 to 4.5. When the value E1/E2 of the ratio is within this range, the hardness of the protrusions is appropriate with respect to the toner core particle surface, so that a good balance between the adhesion of the protrusions to the toner core particle and deformability of the protrusions under pressure is obtained and a higher effect in achieving both high charging performance and charge retention property is demonstrated. E1/E2 is more preferably from 1.5 to 4.2, still more preferably from 2.0 to 4.1.

E2 can be controlled, for example, by adjusting the type and amount of an organosilicon compound segment such as a condensation product of an organosilicon compound present on the outermost surface of the toner core particle. The type and amount of the condensation product of an organosilicon compound present on the outermost surface of the toner core particle can be adjusted by selecting, as appropriate, raw materials and the number of parts.

The toner core particle preferably has an organosilicon compound segment, and more preferably includes a condensation product of an organosilicon compound. The organosilicon compound segment is, for example, a monomer unit having an organosilicon (or a condensation product of an organosilicon compound) introduced into the binder resin. The organosilicon compound segment preferably includes at least one selected from the group consisting of organosilicon compounds and condensation products of organosilicon compounds.

The normalized intensity of silicon ions (m/z=28) defined as in (2) below, which is obtained by measuring a toner core particle with a time-of-flight secondary ion mass spectrometer (hereinafter referred to as TOF-SIMS), is defined as a normalized intensity A. At this time, the normalized intensity A is preferably from $8.00\times10^{-4}$ to $4.00\times10^{-2}$. Having the normalized intensity A means having a silicon element on the surface (outermost surface) of the toner core particle.

Normalized intensity of silicon ions (m/z=28)=(ionic intensity of silicon ions (m/z=28))/(total ionic intensity at m/z=0.5 to 1850). (2)

As a result, when the protrusions of the organosilicon polymer are elastically deformed by pressure and strongly adhere to the toner core particle, charge transfer is promoted between the organosilicon polymer of the protrusions and a silicon-containing substance as an organosilicon compound segment present on the toner core particle surface. Thereby, the charge quantity can be further improved. From the viewpoint of more efficient charge transfer property, the silicon-containing substance is preferably derived from a condensation product of an organosilicon compound.

From the viewpoint of charge retention property, the normalized intensity A is more preferably from $8.00\times10^{-4}$ to $2.00\times10^{-2}$, still more preferably from $8.00\times10^{-4}$ to $1.00\times10^{-2}$, and even more preferably from $5.00\times10^{-3}$ to $1.00\times10^{-2}$.

Furthermore, the normalized intensity B of silicon ions (m/z=28) when a toner core particle is sputtered with an argon gas cluster ion beam for 250 sec under following conditions (3) is defined as a normalized intensity B. At this time, the normalized intensity B is preferably $7.99\times10^{-4}$ or less.

Ar-GCIB, acceleration voltage: 5 kV, current: 6.5 nA, raster size: 600 μm×600 μm, irradiation time: 5 sec/cycle. (3)

Having the normalized intensity B under the conditions of (3) means having silicon ions only on the surface of the toner core particle and in the vicinity thereof. As a result, the charge retention property is improved by suppressing the charge leakage property. In addition, fixing performance is enhanced by suppressing the inhibition of thermoplasticity induced by the silicon-containing substance. More preferably, the normalized intensity B is $6.99\times10^{-4}$ or less. Although the lower limit is not particularly limited, it is preferably $1.00\times10^{-5}$ or more, or $1.00\times10^{-4}$ or more.

The normalized intensity A can be controlled by controlling the amount of silicon ions (m/z=28) in the vicinity of the toner core particle surface.

The normalized intensity B can be controlled by controlling the amount of silicon ions (m/z=28) inside the toner core particle.

The normalized intensity of silicon ions (m/z=28) in the vicinity of the toner core particle surface or inside the toner core particle can be controlled, for example, by a method of controlling the addition amount or addition timing of the organosilicon compound for forming the organosilicon compound segment, such as a condensation product of an organosilicon compound, the reaction time after the addition of the organosilicon compound, and the like.

Although there is no particular limitation on the silicon element from which the normalized intensity A is derived, the normalized intensity A is preferably derived from a condensation product of an organosilicon compound obtained with a silane coupling agent. The silane coupling agent is more preferably a trifunctional silane coupling agent, and still more preferably a trifunctional silane coupling agent having a methacryloxyalkyl group as a substituent, since higher charging performance can be obtained. Further, the silane coupling agent is preferably added during the reaction of the toner core particle in order to cause uneven distribution in the vicinity of the surface of the toner core particle.

For example, there is a method in which a Si-containing monomer such as a silane coupling agent is added during the polymerization process of the toner core particle (for example, in the latter half of the polymerization process) to include silicon in the toner core particle. Further, there is a method in which a silane coupling agent is polymerized in an aqueous medium in which toner core particles are dispersed, and silicon is included in the toner core particles.

The organosilicon compound segment contained in the toner core particle may be contained as part of a resin such as a binder resin contained in the core particle. For example, the binder resin may include a structure represented by a following formula (6). The structure represented by formula (6) can be obtained by polymerizing a trifunctional silane coupling agent having a methacryloxyalkyl group together with a monomer of a styrene acrylic resin. For example, it is preferable to form toner core particles having a styrene acrylic resin as a binder resin by a suspension polymerization method or the like, and further add a trifunctional silane coupling agent having a methacryloxyalkyl group and perform polymerization.

(6)

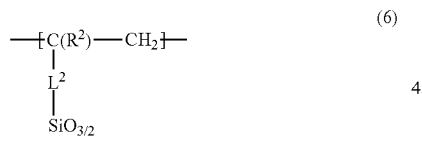

(In formula (6), $L^2$ represents $-COO(CH_2)_n-$ (n is an integer of from 1 to 10 (preferably, from 2 to 8)), and the carbonyl of $L^2$ is bonded to a carbon atom (carbon atom having $R^2$) of the main chain. $R^2$ represents a hydrogen atom or a methyl group).

As the silane coupling agent, a known organosilicon compound can be used without any particular limitation. Specific examples include the following bifunctional silane compounds having two functional groups and trifunctional silane compounds having three functional groups.

Examples of bifunctional silane compounds include dimethyldimethoxysilane and dimethyldiethoxysilane.

Examples of trifunctional silane compounds include the following.

Trifunctional silane compounds having an alkyl group as a substituent, such as ethyltrimethoxysilane, methyltriethoxysilane, methyldiethoxymethoxysilane, methylethoxydimethoxysilane, ethyltrimethoxysilane, ethyltriethoxysilane, propyltrimethoxysilane, propyltriethoxysilane, butyltrimethoxysilane, butyltriethoxysilane, hexyltrimethoxysilane, hexyltriethoxysilane, octyltrimethoxysilane, octyltriethoxysilane, decyltrimethoxysilane, decyltriethoxysilane, and the like;

trifunctional silane compounds having an alkenyl group as a substituent, such as vinyltrimethoxysilane, vinyltriethoxysilane, allyltrimethoxysilane, allyltriethoxysilane, and the like;

trifunctional silane compounds having an aryl group as a substituent, such as phenyltrimethoxysilane, phenyltriethoxysilane, and the like;

trifunctional silane compounds having a methacryloxyalkyl group as a substituent, such as γ-methacryloxypropyltrimethoxysilane, γ-methacryloxypropyltriethoxysilane, γ-methacryloxyoctyltrimethoxysilane, γ-methacryloxypropyldiethoxymethoxysilane, γ-methacryloxypropylethoxydimethoxysilane, 3-methacryloxypropyltris(trimethylsiloxy) silane, and the like; and trifunctional silane compounds having an acryloxyalkyl group as a substituent, such as γ-acryloxypropyltrimethoxysilane, γ-acryloxypropyltriethoxysilane, γ-acryloxyoctyltrimethoxysilane, γ-acryloxypropyldiethoxymethoxysilane, γ-acryloxypropylethoxydimethoxysilane, and the like.

The Young's modulus E2 of the toner core particle surface is preferably 0.50 GPa or more and less than 1.00 GPa. E2 is preferably 0.50 GPa or more from the viewpoint of durability, and preferably less than 1.00 GPa from the viewpoint of improving the charge quantity. E2 is more preferably from 0.60 GPa to 0.95 GPa.

The organosilicon polymer forming the protrusions is preferably a polycondensation product of an organosilicon compound having a structure represented by the following formula (Y).

(Y)

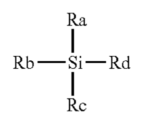

In formula (Y), Ra represents a hydrocarbon group having from 1 to 6 carbon atoms (preferably an alkyl group having from 1 to 6 carbon atoms), and Rb, Rc and Rd each independently represent a halogen atom, a hydroxy group, an acetoxy group, or an alkoxy group.

Ra is preferably an aliphatic hydrocarbon group having from 1 to 3 carbon atoms, more preferably a methyl group.

Rb, Rc and $R^d$ are each independently a halogen atom, a hydroxy group, an acetoxy group, or an alkoxy group (hereinafter also referred to as a reactive group). These reactive groups undergo hydrolysis, addition polymerization and condensation polymerization to form a crosslinked structure.

From the viewpoint of mild hydrolyzability at room temperature and precipitation property on the toner core particle surface, an alkoxy group having from 1 to 3 carbon atoms is preferable, and a methoxy group or an ethoxy group is more preferable.

In addition, the hydrolysis, addition polymerization and condensation polymerization of Rb, Rc and Rd can be controlled by the reaction temperature, reaction time, reaction solvent, and pH. To obtain an organosilicon polymer, organosilicon compounds having three reactive groups (Rb, Rc and Rd) in one molecule, excluding Ra in the formula (Y)

(hereinafter also referred to as a trifunctional silane), may be used singly or in combination.

The compounds represented by the above formula (Y) include the following.

Trifunctional methylsilanes such as methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethohydroxysilane, methylethoxymethoxyhydroxysilane, and methyldiethoxyhydroxysilane.

Trifunctional silanes such ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane, and hexyltrihydroxysilane.

Trifunctional phenylsilanes such as phenyltrimethoxysilane, phenyltriethoxysilane, phenyltrichlorosilane, phenyltriacetoxysilane, and phenyltrihydroxysilane.

In addition, an organosilicon polymer obtained by using the following compounds in combination with the organosilicon compound having the structure represented by formula (Y) may be used to the extent that the effects of the present invention are not impaired. An organosilicon compound with four reactive groups in one molecule (tetrafunctional silane), an organosilicon compound with two reactive groups in one molecule (bifunctional silane), or an organosilicon compound with one reactive group (monofunctional silanes). Examples thereof include the following.

Dimethyldiethoxysilane, tetraethoxysilane, hexamethyldisilazane, 3-aminopropyltrimethoxysilane, 3-aminopropyltriemethoxysilane, 3-(2-aminoethyl)aminopropyltrimethoxysilane, 3-(2-amino ethyl)aminopropyltriethoxysilane, and trifunctional vinylsilanes such as vinyltriisocyanatosilane, vinyltrimethoxysilane, vinyltriethoxysilane, vinyldiethoxymethoxysilane, vinylethoxydimethoxysilane, vinylethoxydihydroxysilane, vinyldimethoxyhydroxysilane, vinylethoxymethoxyhydroxysilane, and vinyldiethoxyhydroxysilane.

The organosilicon polymer of the protrusions more preferably has a structure represented by the following formula (5) because the desired Young's modulus E1 can be easier obtained.

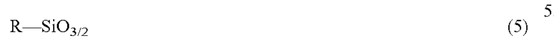

$$R—SiO_{3/2} \quad (5)$$

In formula (5), R represents a hydrocarbon group having from 1 to 6 carbon atoms or an aryl group (preferably a phenyl group). R is preferably an alkyl group having from 1 to 6 carbon atoms, more preferably an alkyl group having from 1 to 3 carbon atoms.

Preferred examples of the alkyl group having from 1 to 3 carbon atoms include a methyl group, an ethyl group, and a propyl group. More preferably, R is a methyl group.

Further, the content of the organosilicon polymer in the toner particle is preferably from 1.0% by mass to 10.0% by mass.

The coverage of the surface of the toner core particle with the protrusions containing the organosilicon polymer is preferably from 30% by area to 70% by area, more preferably from 40% by area to 60% by area. When the coverage is 30% by area or more, a number of protrusions sufficient to obtain the above effect can be present between the toner and the regulating member and between the toner particles, and the charge quantity is likely to be improved.

When the coverage is 70% by area or less, the filler effect due to the presence of the protrusions during fixing is less likely to occur, the sharp melting property of the toner core particle is less likely to be inhibited, and gloss uniformity is likely to be improved.

The coverage of the toner core particle surface can be controlled by adjusting the reactivity of the organosilicon compound during condensation. For example, the coverage can be adjusted to the above range by controlling the pH and retention time of the organosilicon compound during the condensation reaction and the addition amount of the hydrolysate of the organosilicon compound.

The length W of the protrusion is preferably 80 nm or more from the viewpoint of charge retention property during durability, and preferably 250 nm or less from the viewpoint of charge retention property during the process. That is, W is preferably from 80 nm to 250 nm. W is more preferably from 90 nm to 210 nm.

Also, the maximum penetration depth I of the protrusions is preferably from 0.3 nm to 2.0 nm, more preferably from 0.6 nm to 1.2 nm.

The number-average height of the protrusions measured with a scanning probe microscope is denoted by H. The value W/H of the ratio of the length W to H is preferably from 1.5 to 3.7. By satisfying this W/H ratio, the ground area with the toner core particle at the time of deformation and the toner-to-member or toner-to-toner contact area when no deformation takes place are well balanced, and the charging characteristics are improved. Furthermore, since the migration of the protrusions is suppressed due to the improvement in the adhesive force accompanying the increase in the contact area between the toner core particle and the protrusions, the charge retention property is also improved throughout the life.

W/H is more preferably from 2.0 to 3.7, and even more preferably from 3.1 to 3.7.

H is preferably from 25 nm to 100 nm, more preferably from 30 nm to 80 nm, and still more preferably from 30 nm to 60 nm.

H can be controlled by adjusting, as appropriate, the number of added parts of the organosilicon compound that forms the organosilicon polymer. Specifically, H can be increased by increasing the number of added parts of the organosilicon compound. Also, H can be reduced by reducing the number of added parts of the organosilicon compound.

The components constituting the toner and the method for producing the toner will be explained hereinbelow.

The toner core particle includes a binder resin. The content of the binder resin is preferably 50% by mass or more with respect to the total amount of resin components in the toner core particle.

The binder resin is not particularly limited, and examples thereof include styrene acrylic resins, epoxy resins, polyester resins, polyurethane resins, polyamide resins, cellulose resins, polyether resins, and also mixed resins and composite resins thereof. Styrene acrylic resins and polyester resins are preferred because they are inexpensive, readily available, and excellent in low-temperature fixability. Further, the binder resin more preferably includes a styrene acrylic resin from the viewpoint of excellent development durability.

Examples of the styrene acrylic resin include polymers composed of the following monofunctional polymerizable monomers or polyfunctional polymerizable monomers, copolymers obtained by combining two or more of such polymers, and mixtures thereof.

Examples of monofunctional polymerizable monomers include the following.

Styrene; styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, and the like; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, 2-benzoyloxyethyl acrylate, and the like; methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, dibutyl phosphate ethyl methacrylate, and the like; methylene aliphatic monocarboxylic acid esters; vinyl esters such as vinyl acetate, vinyl propionate, vinyl butyrate, vinyl benzoate, vinyl formate, and the like; vinyl ethers such as methyl ether, vinyl ethyl ether, vinyl isobutyl ether, and the like; vinyl ketones such as vinyl methyl ketone, vinyl hexyl ketone, vinyl isopropyl ketone, and the like.

Examples of polyfunctional polymerizable monomers include the following. diethylene glycol diacrylate, triethylene glycol diacrylate, tetraethylene glycol diacrylate, polyethylene glycol diacrylate, 1,6-hexanediol diacrylate, neopentyl glycol diacrylate, tripropylene glycol diacrylate, polypropylene glycol diacrylate, 2,2'-bis(4-(acryloxy-diethoxy)phenyl) propane, trimethylolpropane triacrylate, tetramethylolmethane tetraacrylate, ethylene glycol dimethacrylate, diethylene glycol dimethacrylate, triethylene glycol dimethacrylate, tetraethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2,2'-bis(4-(methacryloxy-diethoxy)phenyl) propane, 2,2'-bis (4-(methacryloxypolyethoxy)phenyl) propane, trimethylolpropane trimethacrylate, tetramethylolmethane tetramethacrylate, divinylbenzene, divinylnaphthalene, divinyl ether, and the like.

The binder resin preferably has a styrene-based monomer unit. The content ratio of the styrene-based monomer unit in the binder resin is preferably from 45.0% by mass to 85.0% by mass, more preferably from 60.0% by mass to 80.0% by mass.

The binder resin preferably further has a monomer unit based on a (meth)acrylic acid alkyl ester having an alkyl group having from 1 to 8 carbon atoms (preferably from 2 to 6 carbon atoms) (more preferably n-butyl acrylate). The content ratio of the monomer unit based on the (meth)acrylic acid alkyl ester in the binder resin is preferably from 5.0% by mass to 40.0% by mass, more preferably from 80.0% by mass to 25.0% by mass.

Furthermore, the toner core particle includes wax. Preferably, the wax is an ester wax. When the toner core particle includes an ester wax, the gloss uniformity of the image is improved even in a light-pressure fixing device configuration.

In the past, color images were required to have high gloss for high image quality. In response to this requirement, it is known to include an ester wax in a toner core particle, so that the toner core particle have a high sharp-melting property, which is advantageous for low-temperature fixing and high glossiness.

However, when such a toner is formed with a shell made of an organosilicon polymer, the sharp-melting property of the toner core particle is not a little hindered, and sufficient effects of low-temperature fixability and high glossiness sometimes cannot be obtained. In particular, with the conventional configuration in which pressure is applied at the edges, the fixing pressure tends to drop at the center of the fixing device, and in such area, less pressure is applied to the toner than at the fixing device edges, which may result in uneven melting of the toner and lower gloss than at the paper edge.

However, where there are protrusions that can be deformed by pressure at the fixing nip or the like, the deformation of the protrusions improves the toner-to-toner adhesion and contact area even in the area where the fixing pressure decreases. As a result, even in a light-pressure fixing device, heat and pressure are uniformly applied to the toner, which is thought to improve gloss uniformity.

Although the ester wax is not particularly limited, it preferably includes an ester compound of a diol and an aliphatic monocarboxylic acid. Further, it is more preferable that the ester wax include an ester compound of an aliphatic diol having from 2 to 6 (preferably from 2 or 3) carbon atoms and an aliphatic monocarboxylic acid having from 14 to 22 (preferably from 14 to 18) carbon atoms.

In addition, the ester wax preferably includes a monomer unit derived from ethylene glycol. That is, it is more preferable that the ester wax include an ester compound of ethylene glycol and an aliphatic monocarboxylic acid having from 14 to 22 (preferably from 14 to 18) carbon atoms.

Examples of diols include ethylene glycol, diethylene glycol, 1,3-propanediol, 1,4-butanediol, 1,6-hexanediol, 1,8-octanediol, 1,10-decanediol, and bisphenols A such as bisphenol A and hydrogenated bisphenol;

Meanwhile, examples of aliphatic monocarboxylic acids include myristic acid, palmitic acid, stearic acid, arachidic acid, behenic acid, lignoceric acid, cerotic acid, montanic acid, melissic acid, oleic acid, vaccenic acid, linoleic acid, linolenic acid, and the like.

A single ester compound may be used for the ester wax, or two or more ester compounds may be used in combination.

In addition, although synthetic ester waxes such as those described above may be used, naturally derived ester waxes such as carnauba wax and rice wax may also be used. When a synthetic ester wax is used, as described above, from the viewpoint of obtaining a low molecular weight ester wax, it is preferable that at least one of the carboxylic acid component and the alcohol component does not include a divalent (dihydric) or higher component, or contains only a small amount thereof.

The molecular weight of the ester wax is such that the main peak molecular weight (Mp) is preferably in the range of from 400 to 1500, more preferably in the range of from 500 to 1000.

The content of the ester wax is preferably from 10.0 parts by mass to 25.0 parts by mass, more preferably from 12.0 parts by mass to 20.0 parts by mass with respect to 100 parts by mass of the binder resin. When the content of the ester wax is within the above range, it is easy to satisfy the heat resistance storage stability required for the toner.

The melting point of the ester wax is preferably from 30° C. to 120° C., more preferably from 60° C. to 90° C. When the melting point of the ester wax is within the above range, the wax is easily melted in the fixing process, and the fixability is less likely to be impaired.

In addition, the binder resin preferably has the monomer unit M1 from the viewpoint of higher gloss uniformity.

When the SP value of the ester wax in the Fedors method is denoted by SP (W) and the SP value of the monomer unit M1 of the binder resin is denoted by SP (M1), the absolute difference |SP (M1)−SP (W)| between SP (M1) and SP (W) is preferably 1.00 or less. The unit of the SP value is $(J/cm^3)^{0.5}$.

When the above SP value relationship is satisfied, the compatibility between the binder resin and the ester wax can be improved, the thermoplasticity can be promoted, and the gloss uniformity can be further improved. |SP (M1)−SP (W)| is more preferably from 0.10 to 1.00, still more preferably from 0.40 to 0.80, and even more preferably from 0.50 to 0.70 from the viewpoint of storage stability.

From the viewpoint of the SP value, the monomer unit M1 more preferably has a structure represented by the following formula (4). The content of the monomer unit M1 in the binder resin is preferably from 3.0% by mass to 30.0% by mass, more preferably from 5.0% by mass to 20.0% by mass, and even more preferably from 6.0% by mass to 15.0% by mass. When the content of the monomer unit M1 is within the above range, gloss uniformity can be further enhanced.

(4)

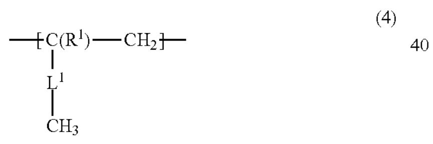

In the formula (4), $L^1$ represents $-COO(CH_2)_n-$, n is an integer of from 11 to 31 (preferably from 11 to 22, even more preferably from 11 to 18), the carbonyl of $L^1$ is bonded to a carbon atom (carbon atom having $R^1$) of the main chain. $R^1$ represents a hydrogen atom or a methyl group.

Where the binder resin contains a plurality of types of monomer units that satisfy the requirements for the monomer unit M1, the SP (M1) value is the weighted average of the SP values of the respective monomer units. For example, where the content of a monomer unit M1-1 having an SP value of SP (M1-1) is A mol % based on the number of moles of all the monomer units satisfying the requirements for the monomer unit M1, and the content of a monomer unit M1-2 having an SP value of SP (M1-2) is (100−A) mol % based on the number of moles of all the monomer units satisfying the requirements for the monomer unit M1, the SP value (SP (M1)) is $$SP(M1)=(SP(M1\text{-}1)\times A+SP(M1\text{-}2)\times(100-A))/100.$$

A similar calculation is performed when three or more types of monomer units satisfying the requirements for the monomer unit M1 are included.

The toner particle may contain a colorant. Known pigments and dyes can be used as the colorant. A pigment is preferable as the colorant because of its excellent light resistance.

Examples of cyan colorants include copper phthalocyanine compounds and derivatives thereof, anthraquinone compounds, basic dye lake compounds, and the like.

Specific examples include the following. C. I. Pigment Blue 1, 7, 15, 15:1, 15:2, 15:3, 15:4, 60, 62, and 66.

Examples of magenta colorants include condensed azo compounds, diketopyrrolopyrrole compounds, anthraquinone compounds, quinacridone compounds, basic dye lake compounds, naphthol compounds, benzimidazolone compounds, thioindigo compounds, perylene compounds, and the like.

Specifically, the following can be mentioned. C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221 and 254, and C. I. Pigment Violet 19.

Examples of yellow colorants include condensed azo compounds, isoindolinone compounds, anthraquinone compounds, azo metal complexes, methine compounds, allylamide compounds, and the like.

Specifically, the following can be mentioned. C. I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191, and 194.

Examples of black colorants include carbon black and those toned black using the above-mentioned yellow, magenta and cyan colorants.

These colorants can be used alone, in mixtures, or in the form of solid solutions. The colorant is preferably used in an amount of from 1.0 parts by mass to 20.0 parts by mass with respect to 100.0 parts by mass of the binder resin.

The toner can also be made into a magnetic toner by including magnetic bodies.

In this case, the magnetic bodies can also serve as a colorant.

Examples of magnetic bodies include iron oxides typified by magnetite, hematite, and ferrite; metals typified by iron, cobalt, and nickel, alloys of these metals with metals such as aluminum, cobalt, copper, lead, magnesium, tin, zinc, antimony, beryllium, bismuth, cadmium, calcium, manganese, selenium, titanium, tungsten, and vanadium, and mixtures thereof.

The toner particle may contain other wax (release agent) in addition to the ester wax described above. Known waxes can be used without any particular limitation. Specifically, the following can be mentioned.

Paraffin waxes, microcrystalline wax, petroleum waxes represented by petrolatum and derivatives thereof, montan wax and derivatives thereof, Fischer-Tropsch process hydrocarbon waxes and derivatives thereof, polyolefin waxes represented by polyethylene and derivatives thereof, carnauba wax, natural waxes represented by candelilla wax and derivatives thereof.

The derivatives include oxides, block copolymers with vinyl monomers, and graft-modified products.

In addition, alcohols such as higher fatty alcohols; fatty acids such as stearic acid, palmitic acid, and the like or amides, esters, and ketones thereof; hardened castor oil and derivatives thereof, vegetable waxes, and animal waxes. These can be used alone or in combination.

Among these, when polyolefins, hydrocarbon waxes obtained by the Fischer-Tropsch method, and petroleum-based waxes are used, developing performance and transferability tend to be advantageously improved. An antioxidant may be added to these waxes as long as the above effects are not affected.

The content of other waxes is preferably from 1.0 parts by mass to 30.0 parts by mass with respect to 100.0 parts by mass of the binder resin or the polymerizable monomers forming the binder resin.

The melting point of other waxes is preferably from 30° C. to 120° C., more preferably from 60° C. to 100° C. By using the wax exhibiting the thermal properties as described above, the release effect is efficiently exhibited, and a wider fixing area is ensured.

External additives such as various organic or inorganic fine particles may be externally added to the toner particle as necessary. The organic or inorganic fine particles preferably have a particle diameter of 1/10 or less of the weight-average particle diameter of the toner particles from the viewpoint of durability when added to the toner particles.

For example, the following are used as organic or inorganic fine particles.

(1) Flowability-imparting agents: silica, alumina, titanium oxide, carbon black, and carbon fluoride.

(2) Abrasives: metal oxides (for example, strontium titanate, cerium oxide, alumina, magnesium oxide, and chromium oxide), nitrides (for example, silicon nitride), carbides (for example, silicon carbide), metal salts (for example, calcium sulfate, barium sulfate, calcium carbonate).

(3) Lubricants: fluororesin powders (for example, vinylidene fluoride and polytetrafluoroethylene), fatty acid metal salts (for example, zinc stearate and calcium stearate).

(4) Charge control particles: metal oxides (for example, tin oxide, titanium oxide, zinc oxide, silica, and alumina) and carbon black.

The surface of the organic or inorganic fine particles may be hydrophobized in order to improve the flowability of the toner and enable uniform charging of the toner particle. Examples of treatment agents for hydrophobic treatment of organic or inorganic fine powder include unmodified silicone varnishes, various modified silicone varnishes, unmodified silicone oils, various modified silicone oils, silane compounds, silane coupling agents, other organosilicon compounds, and organotitanium compounds. These treating agents may be used alone or in combination.

An example of a method for obtaining toner particles will be described below, but this method is not limiting.

As a preferred method for forming the specific protruding shape on the toner core particle surface, there is a method of condensing an organic silicon compound in an aqueous medium in which the toner core particles are dispersed to form protrusions on the toner core particle surface.

It is preferable that a method for forming protrusions on the toner core particle include a step of obtaining a toner core particle dispersion liquid in which the toner core particles are dispersed in an aqueous medium (step 1), and a step of mixing an organic silicon compound (or a hydrolysate thereof) with the toner core particle dispersion liquid and subjecting the organosilicon compound to a condensation reaction in the toner core particle dispersion liquid to form protrusions including the organosilicon polymer on the toner core particles (step 2).

Examples of the method for obtaining the toner core particle dispersion liquid in step 1 include a method of using the toner core particle dispersion liquid, which has been prepared in an aqueous medium, as it is, a method of adding the dried toner core particles to the aqueous medium and mechanically dispersing, and the like. When the dried toner core particles are dispersed in an aqueous medium, a dispersing aid may be used.

Known dispersion stabilizers and surfactants can be used as the dispersion aid.

Specifically, the following are examples of dispersion stabilizers.

Inorganic dispersion stabilizers such as tricalcium phosphate, hydroxyapatite, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica, alumina, and the like; and organic dispersion stabilizers such as polyvinyl alcohol, gelatin, methylcellulose, methylhydroxypropylcellulose, ethylcellulose, sodium salt of carboxymethylcellulose, starch, and the like.

Examples of surfactants include the following. Anionic surfactants such as alkyl sulfates, alkylbenzene sulfonates, fatty acid salts, and the like; nonionic surfactants such as polyoxyethylene alkyl ethers, polyoxypropylene alkyl ethers, and the like; and cationic surfactants such as alkylamine salts, quaternary ammonium salts, and the like.

Among them, it is preferable that an inorganic dispersion stabilizer be included, and it is more preferable that a dispersion stabilizer including a phosphoric acid salt such as tricalcium phosphate, hydroxyapatite, magnesium phosphate, zinc phosphate, aluminum phosphate, and the like be included.

It is preferable that in step 1, the solid content concentration of the toner core particle dispersion liquid be adjusted to from 25% by mass to 50% by mass. Further, the pH of the toner core particle dispersion liquid is preferably adjusted to a pH at which the condensation of the organosilicon compound is unlikely to proceed. Since the pH at which the condensation of the organosilicon polymer is unlikely to proceed differs depending on the substance, it is preferable that the pH be within +0.5 around the pH at which the reaction is most difficult to proceed.

In step 2, the organosilicon compound may be added as it is to the toner core particle dispersion liquid or may be added to the toner core particle dispersion liquid after hydrolysis. Addition after hydrolysis is preferable because the condensation reaction can be easily controlled and the amount of the organosilicon compound remaining in the toner core particle dispersion liquid can be reduced.

For example, as a pretreatment of the organosilicon compound, the organosilicon compound is hydrolyzed in a separate container. Where the amount of the organosilicon compound is 100 parts by mass, the load concentration for hydrolysis is preferably from 40 parts by mass to 500 parts by mass and more preferably from 100 parts by mass to 400 parts by mass of deionized water such as ion-exchanged water or RO water.

The hydrolysis is preferably carried out in an aqueous medium with pH adjusted using a known acid and base. It is known that the hydrolysis of organosilicon compounds is pH-dependent, and the pH at which the hydrolysis is to be performed is preferably changed, as appropriate, according to the type of the organosilicon compound. For example, when methyltriethoxysilane is used as the organosilicon compound, the pH of the aqueous medium is preferably from 2.0 to 6.0. The hydrolysis conditions are preferably a temperature of from 15° C. to 80° C. and a time of from 30 min to 600 min.

Specific examples of acids for adjusting pH include the following.

Inorganic acids such as hydrochloric acid, hydrobromic acid, hydroiodic acid, hypochlorous acid, chlorous acid, chloric acid, perchloric acid, hypobromous acid, bromous acid, bromic acid, perbromic acid, hypoiodic acid, iodous acid, iodic acid, periodic acid, sulfuric acid, nitric acid, phosphoric acid, boric acid, and the like; and organic acids such as acetic acid, citric acid, formic acid, gluconic acid, lactic acid, oxalic acid, tartaric acid, and the like.

Specific examples of bases for adjusting pH include the following.

Alkali metal hydroxides such as potassium hydroxide, sodium hydroxide, lithium hydroxide, and the like and aqueous solutions thereof; alkali metal carbonates such as potassium carbonate, sodium carbonate, lithium carbonate, and the like and aqueous solutions thereof; alkali metal sulfates such as potassium sulfate, sodium sulfate, lithium sulfate, and the like and aqueous solutions thereof; alkali metal phosphates such as potassium phosphate, sodium phosphate, lithium phosphate, and the like and aqueous solutions thereof; alkaline earth metal hydroxides such as calcium hydroxide, magnesium hydroxide, and the like and aqueous solutions thereof; ammonia; amines such as triethylamine and the like; and the like.

In step 2, the temperature of the toner core particle dispersion liquid is preferably adjusted to 35° C. or higher.

The condensation reaction in step 2 is preferably controlled by adjusting the pH of the toner core particle dispersion liquid. It is known that the condensation reaction of organosilicon compounds is pH-dependent, and the pH in carrying out the condensation reaction is preferably changed, as appropriate, according to the type of the organosilicon compound. For example, when methyltrimethoxysilane is used as the organosilicon compound, the pH of the aqueous medium is preferably from 6.0 to 12.0. Acids and bases exemplified in the section on hydrolysis can be used for adjusting the pH.

The amount of the hydrolysate is adjusted to from 5.0 parts by mass to 30.0 parts by mass of the organosilicon compound with respect to 100 parts by mass of the toner core particles, thereby facilitating the formation of the protruding shape.

The properties of the protrusions on the toner core particle surface created by the condensation product of the organosilicon compound can be controlled by adjusting the reactivity of the organosilicon compound during condensation. For example, by controlling the pH, concentration, temperature, retention time, addition amount of the hydrolysate of the organosilicon compound, and the like during the condensation reaction of the organosilicon compound, the properties can be adjusted to desired ranges.

As mentioned above, it is preferable to control the reaction with weak alkalinity and strong alkalinity.

A method for producing toner core particles is not particularly limited, and a suspension polymerization method, a dissolution suspension method, an emulsion aggregation method, a pulverization method, and the like can be used. Among them, in the suspension polymerization method, the organosilicon polymer tends to precipitate uniformly on the surface of the toner core particles, the organosilicon polymer has excellent adhesiveness, and good results are obtained in terms of environmental stability, charge quantity inversion component suppression effect, and the durability thereof. As an example, a method for obtaining toner core particles by a suspension polymerization method will be described hereinbelow.

First, polymerizable monomers capable of forming a binder resin and, if necessary, various additives are mixed, and a disperser is used to prepare a polymerizable monomer composition in which the materials are dissolved or dispersed.

Examples of various additives include colorants, release agents, plasticizers, charge control agents, polymerization initiators, chain transfer agents, and the like.

Examples of dispersers include homogenizers, ball mills, colloid mills, ultrasonic dispersers, and the like.

Next, the polymerizable monomer composition is put into an aqueous medium including poorly water-soluble inorganic fine particles, and a high-speed disperser such as a high-speed stirrer or an ultrasonic disperser is used to prepare droplets of the polymerizable monomer composition (granulation step).

After that, the polymerizable monomers in the droplets of the polymerizable monomer composition are polymerized to obtain toner core particles (polymerization step).

The polymerization initiator may be mixed when preparing the polymerizable monomer composition or may be mixed into the polymerizable monomer composition immediately before forming the droplets in the aqueous medium.

The polymerization initiator can also be added in a state of being dissolved in a polymerizable monomer or another solvent, as necessary, during granulation of droplets or after completion of granulation, that is, immediately before starting the polymerization reaction.

After the polymerizable monomers are polymerized to obtain the binder resin, solvent removal treatment may be performed, as necessary, to obtain a toner core particle dispersion liquid.

As the polymerization initiator, a known polymerization initiator can be used without any particular limitation. Specific examples include the following.

Peroxide-based polymerization initiators represented by hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, ammonium persulfate, sodium persulfate, potassium persulfate, diisopropyl peroxycarbonate, tetralin hydroperoxide, 1-phenyl-2-methylpropyl-1-hydroperoxide, triphenylacetic acid-tert-butyl hydroperoxide, tert-butyl performate, tert-butyl peracetate, tert-butyl perbenzoate, tert-butyl perphenylacetate, tert-butyl permethoxyacetate, per-N-(3-toluyl) palmitic acid-tert-butylbenzoyl peroxide, t-butyl peroxy-2-ethylhexanoate, t-butyl peroxypivalate, t-butyl peroxyisobutyrate, t-butyl peroxyneodecanoate, methyl ethyl ketone peroxide, diisopropyl peroxycarbonate, cumene hydroperoxide, 2,4-dichlorobenzoyl peroxide, lauroyl peroxide, and the like; diazo-based polymerization initiators represented by 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and the like; and the like.

There are no particular restrictions on how the condensation product of the organosilicon compound is included in the toner core particles, and known methods can be used. For example, there is a method of adding a Si-containing monomer having a structure represented by (6) in the reaction form after polymerization during the polymerization step of the toner core particles described hereinabove to obtain the toner core particle containing the resin.

Other examples include a method of polymerizing the monomer in an aqueous medium in which the toner core particles are dispersed to obtain toner core particles containing the resin, and a method of polymerizing the monomer and adding the obtained polymer during the production step of the toner core particles to obtain toner core particles containing the resin.

The monomer is not particularly limited, except that it has the partial structure, but specific examples include the following.

Trifunctional silane compounds having a methacryloxyalkyl group as a substituent, such as γ-methacryloxypropyltrimethoxysilane, γ-methacryloxypropyltriethoxysilane, γ-methacryloxyoctyltrimethoxysilane, γ-methacryloxypropyldiethoxymethoxysilane, γ-methacryloxypropylethoxydimethoxysilane, and the like;

Trifunctional silane compounds having an acryloxyalkyl group as a substituent, such as γ-acryloxypropyltrimethoxysilane, γ-acryloxypropyltriethoxysilane, γ-acryloxyoctyltrimethoxysilane, γ-acryloxypropyldiethoxymethoxysilane, γ-acryloxypropylethoxydimethoxysilane, and the like.

Various measurement methods are described below.

Method for Measuring E1 and E2

E1 and E2 are derived by performing force curve measurements of the protrusions of the organosilicon polymer on the toner particle surface and of the toner core particle surface by using a scanning probe microscope (SPM) "AFM5500M" manufactured by Hitachi High-Tech Corporation. As a cantilever (hereinafter also referred to as a probe) used for measurement, "SI-DF3P2" marketed by Hitachi High-Tech Fielding Corp. is used.

The SPM used for measurement is calibrated in advance for positional accuracy in the XYZ directions, and the cantilever used for measurement is measured in advance for the tip curvature radius of the probe.

The tip curvature radius of the probe is measured using a probe evaluation sample "TGT1-NT-MDT" marketed by Hitachi High-Tech Fielding Corp. The value of the tip curvature radius is selected so that the toner core particle surface can be measured without contacting the protrusions. In the present disclosure, 7 nm is used.

Next, the Young's modulus is calibrated using the probe for which the tip curvature radius has been confirmed. In the present disclosure, a PMMA (polymethyl methacrylate) plate is used as a standard material, and calibration is performed with an accuracy of 3.0 GPa±5%. After calibration, the force curve measurement of the PMMA plate is performed at 100 points. In the examples, the average Young's modulus was 2.91 GPa.

In the measurement of toner particles, first a conductive double-sided tape is attached to a sample stage, and toner particles are sprayed thereon. Excess toner particles are then removed from the sample stage by air blowing. The shape of this sample is measured with the AFM5500M in the range of 1 μm×1 μm on the toner particle surface, and the protrusions and the toner core particle surface are measured.

To distinguish whether the position where the Young's modulus was measured is the protrusion containing the organosilicon polymer or the toner core particle surface, SEM-EDS measurement in a below-described method for confirming that the bright portion in the backscattered electron image is derived from an organosilicon polymer is performed on the tone particle for which the Young's modulus has been measured. Specifically, a region where both silicon and carbon are detected in the SEM-EDS measurement is defined as a protrusion including the organosilicon polymer. Further, the region where silicon is not detected, but carbon is detected in the SEM-EDS measurement is defined as the toner core particle surface.

In order to eliminate the influence of deterioration of the resin and the organosilicon polymer due to electron beam irradiation in the SEM-EDS measurement, the SEM-EDS measurement is performed after the SPM measurement to distinguish whether the segment where the measurement was performed is a protrusion including the organosilicon polymer or the toner core particle surface.

Toner particles having a particle diameter equal to the weight-average particle diameter (D4) of the toner particles are selected to be measured.

The probe indentation depth is set to one-tenth of the average height H (nm) of the protrusions, force curve measurement is performed on the protrusions and on the toner core particle surface, and the load-indentation curve is used to derive Young's modulus of the protrusions and toner core particle surface on the basis of the Hertz's contact theory formula ("Hertz" is selected in the fitting model).

In addition, in the measurement of the protrusions, the probe indentation amount is set to an indentation depth of one tenth of the average height H (nm) of the protrusions in order to eliminate the influence of the toner core particle.

The measurement at 10 points for the protrusions and 10 points for the toner core particle surface for one toner particle is performed for 10 toner particles. The values obtained by averaging the Young's moduli obtained for a total of 100 points are used as the values of E1 and E2.

Calculation of Coverage of Toner Particle Surface

Method for Acquiring Backscattered Electron Image of Toner Particle Surface

The coverage of the toner particle surface with the organosilicon polymer is calculated using a backscattered electron image of the toner particle surface.

The backscattered electron image of the toner particle surface is obtained with a scanning electron microscope (SEM).

A backscattered electron image obtained from a SEM is also called a "compositional image", and the smaller the atomic number, the darker image is detected, and the higher the atomic number, the brighter image is detected.

A toner particle is generally a resin particle that mainly contains composition including a resin component and carbon of a release agent or the like as main components. When an organosilicon polymer is present on the toner particle surface, the organosilicon polymer is observed as a bright portion and the toner core particle surface is observed as a dark portion in a backscattered electron image obtained by SEM.

The SEM device and observation conditions are as follows.

- Device used: ULTRA PLUS manufactured by Carl Zeiss Microscopy Co., Ltd.
- Accelerating voltage: 1.0 kV
- WD: 2.0 mm
- Aperture size: 30.0 μm
- Detection signal: EsB (energy selective backscattered electron)
- EsB Grid: 800 V
- Observation magnification: 50,000 times.
- Contrast: 63.0±5.0% (reference value)
- Brightness: 38.0±5.0% (reference value)
- Image size: 1024×768 pixels
- Pretreatment: toner particles are sprayed on carbon tape (no vapor deposition)

Contrast and brightness are set, as appropriate, according to the state of the device used. Also, the acceleration voltage and EsB Grid are set so as to achieve items such as acquisition of structural information on the outermost surface of toner particle, prevention of charge-up of the non-vapor-deposited sample, and selective detection of high-energy backscattered electrons. The observation field is selected near the vertex where the curvature of the toner particle is the smallest.

Method for Confirming that Bright Portion in Backscattered Electron Image is Derived from Organosilicon Polymer The fact that the bright portion in the observed backscattered electron image is derived from the organosilicon polymer is confirmed by superimposing an elemental mapping image obtained by energy dispersive X-ray analysis (EDS) that can be acquired with a scanning electron microscope (SEM) and the backscattered electron image.

The SEM/EDS device and observation conditions are as follows.

Device used (SEM): ULTRA PLUS manufactured by Carl Zeiss Microscopy Co., Ltd.

Device used (EDS): NORAN System 7, Ultra Dry EDS Detector manufactured by Thermo Fisher Scientific Inc.

Accelerating voltage: 5.0 kV

WD: 7.0 mm

Aperture size: 30.0 μm

Detection signal: SE2 (secondary electron)

Observation magnification: 50,000 times

Mode: Spectral Imaging

Pretreatment: toner particles are sprayed on carbon tape and platinum sputtering The mapping image of the silicon element obtained by this method is superimposed on the backscattered electron image, and it is confirmed that the silicon atom portion of the mapping image and the bright portion of the backscattered electron image match. A portion where both the silicon atom portion and the carbon atom portion of the mapping image match the bright portion of the backscattered electron image is defined as the organosilicon polymer.

The organosilicon polymer and silica are distinguished by confirming that the portion containing both silicon atoms and carbon atoms is an organosilicon polymer.

Method for Measuring Coverage of Toner Particle Surface by Organosilicon Polymer The coverage is calculated based on a non-covered portion domain D1, which is not covered with the organosilicon polymer, and a covered portion domain D2, which is covered with the organosilicon polymer. Domains D1 and D2 are analyzed by using image processing software ImageJ (developed by Wayne Rashand) on the backscattered electron image of the outermost surface of the toner particle obtained by the above method. The procedure is shown below.

First, from "Type" in the "Image" menu, the backscattered electron image to be analyzed is configured to 8-bit. Next, from "Filters" in the "Process" menu, the median diameter is set to 2.0 pixels to reduce image noise. The image center is estimated after excluding the observation condition display area displayed at the bottom of the backscattered electron image, and a 1.5 μm square range is selected from the image center of the backscattered electron image using the "Rectangle Tool" on the toolbar.

Next, the "Freehand selections" function in the "Image" menu is used to select only the portion where the carbon atom portion of the mapping image and the dark portion of the backscattered electron image match, and the selected portion is entirely filled with black. In addition, all areas other than the portion where the carbon atom portion of the mapping image and the dark portion of the backscattered electron image match are filled with white. Next, "Threshold" is selected from "Adjust". In manual operation, 128, which is the middle gray level between black and white in an 8-bit image, is selected as the threshold and "Apply" is clicked to obtain a binarized image.

By this operation, the pixels corresponding to the non-covered portion domain D1 (toner core particle) are displayed in black (pixel group A1), and the pixels corresponding to the covered portion domain D2 (organosilicon polymer) are displayed in white (pixel group A2).

After excluding the observation condition display, which is displayed at the bottom of the backscattered electron image, the image center is estimated again, and the "Rectangle Tool" on the toolbar is used to select a 1.5 μm square range from the image center of the backscattered electron image.

Next, using the straight line tool ("Straight Line") on the toolbar, the scale bar in the observation condition display area that is displayed at the bottom of the backscattered electron image is selected. Where "Set Scale" is selected from the "Analyze" menu in that state, a new window opens, and the pixel distance of the selected straight line is entered in the "Distance in Pixels" column.

The scale bar value (for example, 100) is entered in the "Known Distance" column of the window, the scale bar unit (for example, nm) is input in the "Unit of Measurement column", and where OK is clicked, the scale setting is completed.

Next, "Set Measurements" is selected from the "Analyze" menu and the "Area" and "Feret's diameter" are checked. "Analyze Particles" is selected from the "Analyze" menu, the "Display Result" is checked, and where OK is clicked the domain analysis is performed.

From the newly opened "Results" window, the area ("Area") for each domain corresponding to the non-covered portion domain D1 formed by the pixel group A1 and the covered portion domain D2 formed by the pixel group A2 is acquired.

The total area of the non-covered portion domain D1 is denoted by S1 (μm$^2$), and the total area of the covered portion domain D2 is denoted by S2 (μm$^2$). The coverage S is calculated from the obtained S1 and S2 by the following formula.

$$S(\% \text{ by area})=\{S2/(S1+S2)\}\times 100.$$

The above procedure is performed for 10 fields of view for the toner particles to be evaluated, and the arithmetic mean value is used as the coverage.

Method for Measuring Number-Average Height H of Protrusions on Toner Particle Surface Using the AFM5500M used to measure the Young's modulus, the protrusions on the toner particle surface are observed by the following method.

The observation is performed in a dynamic force mode by using SI-DF3P2 as the cantilever used for measurement. In the same manner as in the Young's modulus measurement, shape measurement is performed with the AFM5500M in the range of 1 μm×1 μm on the toner particle surface, and protrusions on the toner particle surface are observed. Toner particles having a particle diameter equal to the weight-average particle diameter (D4) of the toner particles are selected to be measured.

After the measurement, the maximum surface height Sp is calculated after performing the tilt correction of the obtained 1 μm×1 μm measurement data. The tilt correction of the measurement data is performed by conducting curved surface correction on the measured data in the order of first-order curved surface correction, second-order curved surface correction, and third-order curved surface correction. The correction is performed using AFM5000II, which is analysis software provided with AFM5500M. In the present disclosure, the tilt correction of measurement data is performed by analysis processing in the order of primary tilt correction (primary curved surface correction), secondary tilt correction (secondary curved surface correction), and tertiary tilt correction (tertiary curved surface correction) in the analysis software.

Sp means the maximum height from the outermost surface of the toner core particle to the apex of the protrusion in 1 μm×1 μm. Sp can be calculated by referring to the Sp value displayed when the surface roughness analysis on the analysis tab of the analysis software is activated for the data subjected to tilt correction. When the obtained Sp is the height h1 (nm) of the protrusion, the heights h1 to h50 of the protrusions of 50 toner particles are obtained by the above method, and the arithmetic mean value of h1 to h50 is taken as the average height H (nm) of the protrusions.

Method of Obtaining Toner Particles by Removing External Additive from Toner

When analyzing protrusions and measuring properties thereof such as Young's modulus on the toner surface with external additives attached thereto, the analysis is performed after removing the external additives by the following operation to obtain toner particles.

A total of 160 g of sucrose (manufactured by Kishida Chemical Co., Ltd.) is added to 100 mL of ion-exchanged water and dissolved while heating in a hot water bath to prepare a 61.5% sucrose aqueous solution. A total of 31.0 g of the concentrated sucrose solution and 6 g of CONTAMINON N (trade name) (a 10% by mass aqueous solution of a neutral detergent for washing precision measuring instruments with a pH of 7 which is composed of a nonionic surfactant, an anionic surfactant, and an organic builder; manufactured by Wako Pure Chemical Industries, Ltd.) are placed in a centrifuge tube to prepare a dispersion liquid. Then, 1.0 g of toner is added to this dispersion liquid, and lumps of toner are loosened with a spatula or the like.

The centrifuge tube is shaken with a shaker ("KM Shaker" (model: V. SX), manufactured by Iwaki Industry Co., Ltd.) at 300 spm (strokes per min) for 20 min. After shaking, the solution is transferred in a swing rotor glass tube (50 mL) and separated in a centrifuge (H-9R, manufactured by Kokusan Co., Ltd.) at 3500 rpm for 30 min.

Sufficient separation of toner particles and the aqueous solution is visually confirmed, and toner particles separated in the uppermost layer are collected with a spatula or the like. The collected toner particles are filtered with a vacuum filter and dried with a dryer for 1 h or longer. The dried product is pulverized with a spatula to obtain toner particles.

Method for Calculating Length W and Maximum Penetration Depth I of Protrusions

A cross section of the toner observed with a scanning transmission electron microscope (STEM) is prepared as follows.

The procedure for preparing the cross section of the toner will be described below.

First, the toner is scattered in a single layer on a cover glass (Matsunami Glass Ind., Ltd., square cover glass; square No. 1), and an Os film (5 nm) and a naphthalene film (20 nm) are applied as protective films by using Osmium Plasma Coater (Filgen, Inc., OPC80T).

Next, a PTFE tube (inner diameter 1.5 mm× outer diameter 3 mm) is filled with a photocurable resin D800 (JEOL Ltd.), and the cover glass is gently placed on the tube so that the toner comes into contact with the photocurable resin D800. After the resin is cured by light irradiation in this state, the cover glass and the tube are removed to form a columnar resin in which the toner is encapsulated in the outermost surface.

Using an ultrasonic ultramicrotome (Leica, UC7), cutting is performed at a cutting speed of 0.6 mm/s through a length equal to the radius of the toner (for example, 4.0 μm when the weight-average particle diameter (D4) is 8.0 μm) from the outermost surface of the cylindrical resin to expose the cross section of the central portion of the toner Next, the toner is cut to a film thickness of 100 nm to prepare a thin sample of the cross section of the toner. A cross section of the central portion of the toner can be obtained by cutting by such a method.

An image with an image size of 1024×1024 pixels is acquired with a STEM probe size of 1 nm. The image is acquired by adjusting "Contrast" to 1425 and "Brightness" to 3750 on the "Detector Control" panel in the bright-field image and adjusting "Contrast" to 0.0, "Brightness" to 0.5, and "Gamma" to 1.00 on the "Image Control" panel. The image magnification is 100,000 times, and the image is acquired so as to fit in about ¼ to ½ of the cross-sectional circumference of one toner particle as shown in FIG. 2.

For the obtained image, image analysis is performed using image processing software (Image J (available from https://imagej.nih.gov/ij/)), and the protrusions containing the organosilicon polymer are measured. The image analysis is performed on 30 STEM images.

Measurement is performed after overlapping the scale on the image with "Straight Line" on the "Straight" tab in Image J, and setting the length of the scale on the image with "Set Scale" on the "Analyze" tab. A line segment corresponding to the protrusion width W or protrusion height H can be drawn with "Straight Line" on the "Straight" tab and measured with "Measure" on the "Analyze" tab.

Figure 2:
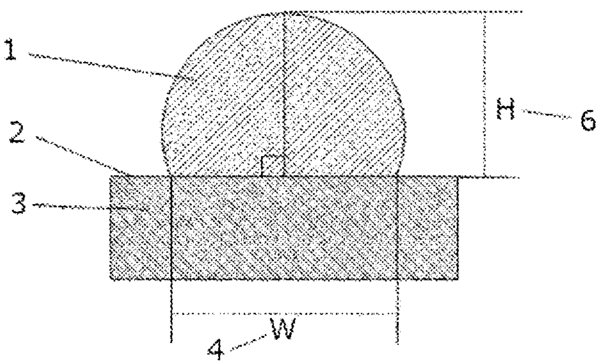
FIG. 2 is a schematic diagram illustrating a case in which a particle does not penetrate into toner.

FIGS. 1 and 2 show schematic diagrams of toner cross section. FIG. 1 is a schematic diagram of a protrusion when the maximum penetration depth I is large, and FIG. 2 is a schematic diagram when the maximum penetration depth I is absent or extremely small. First, a line is drawn along the circumference of the toner core particle surface from the cross-sectional image of the toner. The portion where the protrusion of the organosilicon polymer is embedded and penetrated into the toner core particle is assumed not to be embedded, and the lines are connected smoothly (to maintain the curvature of the core particle). Transformation into a horizontal image is performed based on the line along the circumference.

In the horizontal image, the length of a line segment (reference line) connecting both ends of the interface between the toner core particle and the protrusion at the portion where the toner core particle and the protrusion form a continuous interface is denoted by W (nm) (FIGS. 1 and 2). In addition, the maximum length of the protrusion in the toner core particle direction from the reference line in the direction normal to the reference line is defined as the maximum penetration depth I (nm) (FIG. 1). That is, where the central side of the toner core particle from the reference line is defined as a penetration region, I means the maximum depth of the penetration region in the direction normal to the reference line.

The symbols in the figures are as follows. 1: protrusion, 2: core particle surface (line along the circumference of the core particle surface converted into a horizontal image), 3: toner core particle, 4: length W, 5: penetration depth I, 6: height H. With respect to the horizontal image, the length W and the maximum penetration depth I are measured by the method described above for each protrusion containing the organosilicon polymer, and the number-average value of 100 values is adopted as the value of W and I, respectively. For the average height H of the protrusions, a value measured using the scanning probe microscope described above is used for more accurate measurement.

Whether the protrusion contains the organosilicon polymer is confirmed as follows.

In a thin sample of the cross section of the toner particle, the cross section of the toner particle is observed by using a transmission electron microscope (TEM) (JEM2800 type: manufactured by JEOL Ltd.) at a magnification of 500,000 times under the conditions of an acceleration voltage of 200 V and an electron beam probe size of 1 mm. A cross section having a major axis of the weight-average particle diameter (D4)±10% of the toner particles to be observed is to be observed.

The distinction between the organosilicon polymer and the toner core particles can be determined from the types and concentrations of the constituent elements of the shell and core. The constituent elements can be analyzed by the EDS described above.

For example, since the organosilicon polymer contains many silicon atoms, and the toner core particle contains many carbon atoms, the organosilicon polymer can be distinguished from the ratio of silicon to carbon. In addition, the organosilicon polymer and silica can be identified by utilizing the fact that the organosilicon polymer contains carbon atoms in addition to silicon atoms, whereas silica does not contain carbon atoms.

Method for Measuring Weight-Average Particle Diameter (D4) and Number-Average Particle Diameter (D1) of Toner Particles or Toner A precision particle diameter distribution measuring device (trade name: Coulter Counter Multisizer 3) based on a pore electrical resistance method and dedicated software (trade name: Beckman Coulter Multisizer 3, Version 3.51, manufactured by Beckman Coulter Inc.) are used. An aperture diameter of 100 μm is used, measurement is performed with 25,000 effective measurement channels, and the measurement data are analyzed and calculated. The electrolytic aqueous solution used for the measurement can be obtained by dissolving special grade sodium chloride in ion-exchanged water so that the concentration becomes 1% by mass. For example, ISOTON II (trade name) manufactured by Beckman Coulter Inc. can be used. Before performing measurement and analysis, the dedicated software is set as follows.

In the "Change Standard Measurement Method (SOM) Screen" of the dedicated software, the total count number in the control mode is set to 50,000 particles, the number of measurements is set to 1, and the Kd value is set to a value obtained using standard particles 10.0 μm (manufactured by Beckman Coulter Inc.). By pressing the threshold/noise level measurement button, the threshold and noise level are automatically set. Also, the current is set to 1600 μA, the gain is set to 2, the electrolytic solution is set to ISOTON II (trade name), and the flush of aperture tube after measurement is checked.

In the "Pulse-to-Particle Diameter Conversion Setting Screen" of the dedicated software, the bin interval is set to logarithmic particle diameter, the particle diameter bin is set to 256 particle diameter bins, and the particle diameter range is set to from 2 μm to 60 μm.

The specific measurement method is as follows.

(1) A total of 200 mL of the electrolytic aqueous solution is placed into a 250 mL glass round-bottomed beaker dedicated to Multisizer 3, the beaker is set on a sample stand, and counterclockwise stirring is performed with a stirrer rod at 24 rev/sec. Then, dirt and air bubbles inside the aperture tube are removed by a "Flush Aperture" function of the analysis software.

(2) A total of 30 mL of the electrolytic aqueous solution is placed into a 100 mL flat-bottom glass beaker. Here, 0.3 mL of a diluted solution obtained by three-fold (by mass) dilution of CONTAMINON N (trade name) (a 10% by mass aqueous solution of a neutral detergent for cleaning precision measuring instruments, manufactured by Wako Pure Chemical Industries, Ltd.) with ion-exchanged water is added to the beaker.

(3) A predetermined amount of ion-exchanged water and 2 mL of CONTAMINON N (trade name) are added to the water tank of an ultrasonic disperser (trade name: Ultrasonic Dispersion System Tetora 150, manufactured by Nikkaki Bios Co., Ltd.) with an electrical output of 120 W in which two oscillators with an oscillation frequency of 50 kHz are incorporated with a phase shift of 180 degrees.

(4) The beaker of (2) is set in the beaker fixing hole of the ultrasonic disperser, and the ultrasonic disperser is actuated. The height position of the beaker is adjusted so that the resonance state of the liquid level of the electrolytic aqueous solution in the beaker is maximized.

(5) A total of 10 mg of toner (particles) is added little by little to the electrolytic aqueous solution in the beaker of (4) and dispersed while the electrolytic aqueous solution is being irradiated with ultrasonic waves. Then, the ultrasonic dispersion treatment is continued for another 60 sec. In the ultrasonic dispersion, the temperature of the water in the water tank is adjusted, as appropriate, to from 10° C. to 40° C.

(6) The electrolytic aqueous solution of (5) in which toner (particles) is dispersed is dropped using a pipette into the round-bottomed beaker of (1) set in the sample stand, and the measured concentration is adjusted to 5%. The measurement is continued until the number of measured particles reaches 50,000.

(7) The measurement data are analyzed with the dedicated software provided with the device to calculate the weight-average particle diameter (D4). The "Average Diameter" on the analysis/volume statistics (arithmetic mean) screen when graph/% by volume is set using the dedicated software is taken as the weight-average particle diameter (D4). The "Average Diameter" on the analysis/number statistics (arithmetic mean) screen when graph/% by number is set using the dedicated software is taken as the number-average particle diameter (D1).

Composition Analysis of Wax

The composition analysis of the wax in the toner particle can be performed using nuclear magnetic resonance equipment ($^1$H-NMR, $^{13}$C-NMR) and a FT-IR spectrum. The equipment used is described below. Each sample may be collected by fractionating from the toner and analyzed.

(i) $^1$H-NMR, $^{13}$C-NMR

Measurement device: FT NMR device JNM-EX400 (manufactured by JEOL Ltd.)

Measurement frequency: 400 MHz

Pulse condition: 5.0 μs

Frequency range: 10,500 Hz

Accumulated times: 64 times (ii) FT-IR Spectrum

AVATAR 360 FT-IR, manufactured by Thermo Fisher Scientific Inc.

Method for Confirming Partial Structure Represented by Formula (5)

The following method is used to confirm the structure represented by formula (5) in the organosilicon polymer contained in the toner particle. By using the tetrahydrofuran-insoluble matter in the toner particle as a sample, the influence of the organosilicon compound segment in the toner core particle can be eliminated.

The hydrocarbon group represented by R in formula (5) is confirmed by $^{13}C$-NMR ($^{13}C$-NMR (Solid) Measurement Conditions)

Device: JNM-ECX500II, manufactured by JEOL RESONANCE Inc.

Sample tube: 3.2 mmφ

Sample: 150 mg of tetrahydrofuran-insoluble matter in toner particle for NMR measurement Measurement temperature: room temperature Pulse mode: CP/MAS Measurement nuclear frequency: 123.25 MHz ($^{13}C$)

Reference substance: adamantane (external standard: 29.5 ppm)

Sample rotation speed: 20 kHz

Contact time: 2 ms

Delay time: 2 s

Accumulated times: 1024 times

In this method, the hydrocarbon group represented by R in formula (5) is confirmed by the presence/absence of a signal generated from a methyl group ($Si—CH_3$), an ethyl group ($Si—C_2H_5$), a propyl group ($Si—C_3H_7$), a butyl group ($Si—C_4H_9$), a pentyl group ($Si—C_5H_{11}$), a hexyl group ($Si—C_6H_{13}$), a phenyl group ($Si—C_6H_5$), or the like bonded to a silicon atom.

Furthermore, the structure that binds to Si is confirmed by solid-state $^{29}Si$-NMR.

Specifically, the structure represented by formula (5) can be confirmed by confirming the T unit structure by solid-state $^{29}Si$-NMR, which will be described hereinbelow. If it is necessary to confirm the structure in more detail, the results of $^{1}H$-NMR measurement may also be used for identification.

Fractionation of Binder Resin from Toner

Each physical property can also be measured using the binder resin fractionated from the toner by the following method.

A total of 10.0 g of toner particles are weighed, put in a cylindrical filter paper (No. 84 manufactured by Toyo Roshi Kaisha, Ltd.), and placed in a Soxhlet extractor. Extraction is performed using 200 mL of THE as a solvent for 20 h, and the solid matter obtained by removing the solvent from the extract is taken as the THF-soluble matter of the toner. The binder resin is included in the THF-soluble matter. This is done multiple times to obtain the required amount of THF-soluble matter.

For the solvent gradient elution method, gradient preparative HPLC (LC-20AP high-pressure gradient preparative system manufactured by Shimadzu Corporation, SunFire preparative column 50 mmφ, 250 mm manufactured by Waters Corp.) is used. The column temperature is 30° C., the flow rate is 50 mL/min, acetonitrile is used as a poor solvent and THE is used as a good solvent for mobile phases. A sample for separation is prepared by dissolving 0.02 g of the THF-soluble matter obtained by the extraction in 1.5 mL of THF. The mobile phase starts with a composition of 100% acetonitrile, and the proportion of THF is increased by 4% per minute when 5 min have passed after sample injection, until the composition of the mobile phase reaches 100% THF over 25 min. The components can be separated by drying the obtained fractions.

Which fraction component is the binder resin can be determined by $^{1}H$-NMR measurement, which will be described hereinbelow.

Method for Identifying Monomer Units Contained in Binder Resin and Measuring Content Ratio of Each Monomer Unit $^{1}H$-NMR spectrum measurement is used to identify various monomer units in the binder resin and to confirm whether the resin has the structure represented by formula (4).

In addition, the content ratio of each monomer unit contained in the resin is measured by $^{1}H$-NMR under the following conditions.

Measuring device: FT NMR device JNM-EX400 (manufactured by JEOL Ltd.)

Measurement frequency: 400 MHz

Pulse condition: 5.0 μs

Frequency range: 10,500 Hz

Accumulated times: 64 times

Measurement temperature: 30° C.

Sample: prepared by putting 50 mg of binder resin as a measurement sample into a sample tube with an inner diameter of 5 mm, adding deuterated chloroform ($CDCl_3$) as a solvent, and dissolving in a constant temperature bath at 40° C.

From the obtained $^{1}H$-NMR chart, among the peaks attributed to the constituent elements of the monomer unit M1, a peak independent of the peaks attributed to the constituent elements of other monomer units is selected, and the integral value i1 of this peak is calculated.

Similarly, from among the peaks attributed to the constituent elements of the monomer unit M2, a peak independent of the peaks attributed to the constituent elements of the monomer units derived from other monomers is selected, and the integral value i2 of this peak is calculated.

From among the peaks attributed to the constituent elements of the structure (monomer unit) represented by formula (4), a peak independent of the peaks attributed to the constituent elements of the monomer units derived from other monomers is selected, and the integral value i3 of this peak is calculated.

The integral value I1 of the peak attributed to the methylene group of the polymer main chain of the resin containing the monomer unit M1 is calculated.

Similarly, the integral value I2 of the peak attributed to the methylene group of the polymer main chain of the resin containing the monomer unit M2 is calculated.

The integral value I3 of the peak attributed to the methylene group of the polymer main chain of the resin having the structure represented by formula (4) is calculated.

The content ratio of the monomer unit M1 is obtained as follows using the integral values i1, i2, i3 and I1, I2, I3. Here, n1, n2, n3, N1, N2, and N3 are the numbers of hydrogen atoms in the constituent elements to which the peaks of interest for each segment are attributed.

n1 corresponds to i1, n2 corresponds to i2, n3 corresponds to i3, N1 corresponds to I1, N2 corresponds to I2, and N3 corresponds to I3.

$$\text{Content ratio of monomer unit } M1 \text{ (mol \%)}=\{(i1/n1)/(I1/N1)\}\times 100$$

Similarly, the content ratio of the monomer unit M2 is obtained as follows.

$$\text{Content ratio of monomer unit } M2 \text{ (mol \%)}=\{(i2/n2)/(I2/N2)\}\times 100$$

Content ratio (mol %) of the structure represented by formula (4)={(i3/n3)/(I3/N3)}×100

The content ratio of the structure represented by formula (4) and based on the THF-soluble matter of the toner is calculated using the content ratio of the structure represented by formula (4) and contained in the resin.

Method for Calculating SP (M1) and SP (W)

SP (M1) and SP (W) are obtained as follows according to the calculation method proposed by Fedors.

Vaporization energy (Δei) (cal/mol) and molar volume (Δvi) ($cm^3$/mol) are obtained from the tables described in "Polym. Eng. Sci., 14 (2), 147-154 (1974)" for atoms or atomic associations in each molecular structure, and $(4.184\times\Sigma\Delta ei/\Sigma\Delta vi)^{0.5}$ is defined as the SP value $(J/cm^3)^{0.5}$.

Specifically, the evaporation energy (Δei) and molar volume (Δvi) of the monomer unit M1 and the ester wax are obtained, and SP values are calculated from the following formula by dividing the evaporation energy by the molar volume.

$$SP(M1) \text{ or } SP(W)=\{4.184\times(\Sigma j\times\Sigma\Delta ei)/(\Sigma j\times\Sigma\Delta vi)\}^{0.5}$$

Method for Measuring Normalized Intensity of Silicon Ions Present on Toner Core Particle Surface (Normalized Intensity A)

The normalized intensity of silicon ions on the surface of the toner core particle is confirmed by a time-of-flight secondary ion mass spectrometer (TOF-SIMS). The equipment used and the measurement conditions are shown below.

The measurement is performed on toner core particles, or on toner particles from which external additives such as silica have been removed by the method described hereinbelow.

Measurement device: nanoTOF II (trade name, manufactured by ULVAC-Phi, Inc.)
Primary ion species: $Bi^{3++}$
Acceleration voltage: 30 kV
Primary ion current: 0.05 pA
Repetition frequency: 8.2 kHz
Raster mode: Unbunch
Raster size: 100 μm×100 μm
Measurement mode: Positive
Neutralization electron gun: used
Measurement time: 600 sec.
Sample preparation: toner core particles or toner particles are fixed to an indium sheet
Sample pretreatment: none Evaluation is performed from the mass numbers of Si ions and fragment ions generated from the resin or silane compound by using standard software (TOF-DR) of ULVAC-Phi, Inc.

The normalized intensity of silicon ions (m/z=28) can be derived by dividing the ion intensity derived from silicon with a mass number of 28 (m/z=28) by the total ion intensity at m/z=0.5 to 1850.

It is confirmed by 29Si-NMR (solid) measurement described hereinbelow that the normalized intensity of silicon ions (m/z=28) is derived from the organosilicon compound segment such as the condensation product of the organosilicon compound.

Where the toner particle contains a silicon compound other than the organosilicon compound segment, the content ratio of the condensation product of the organosilicon compound to the silicon compound contained in the toner particle is derived by $^{29}$Si-NMR (solid) measurement. The value obtained by multiplying the normalized intensity of silicon ions (m/z=28) by the content ratio thereof is regarded as the intensity derived from the condensation product of the organosilicon compound.

(Measurement Conditions of $^{29}$Si-NMR (Solid-State))

Device: JNM-ECX500II manufactured by JEOL RESONANCE Inc.
Sample tube: 3.2 mmφ
Sample amount: 150 mg
Measurement temperature: room temperature
Pulse mode: CP/MAS
Measurement nuclear frequency: 97.38 MHz ($^{29}$Si)
Reference substance: DSS (external standard: 1.534 ppm)
Sample rotation speed: 10 kHz
Contact time: 10 ms
Delay time: 2 s
Accumulated times: 2000 times to 8000 times By the above measurement, the abundance ratio can be obtained by separating and integrating the peaks of a plurality of silane components corresponding to the number of oxygen atoms bonded to Si by curve fitting.

Those having at least one or more of the following M unit, D unit, or T unit structures can be regarded as condensation products of organosilicon compounds. Those having the following Q unit structure can be regarded as silicon compounds other than condensation products of organosilicon compounds.

M Unit

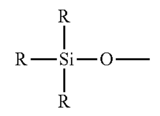

D Unit

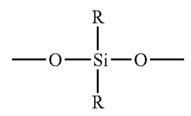

T Unit

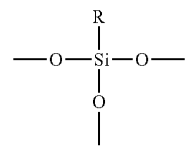

Q Unit

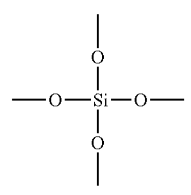

Removal of External Additive

A total of 160 g of sucrose (manufactured by Kishida Chemical Co., Ltd.) is added to 100 mL of ion-exchanged water and dissolved while heating in a hot water bath to prepare a concentrated sucrose solution. A total of 31 g of the concentrated sucrose solution and 6 mL of CONTAMINON N (a 10% by mass aqueous solution of a neutral detergent for washing precision measuring instruments with a pH of 7 which is composed of a nonionic surfactant, an anionic surfactant, and an organic builder; manufactured by Wako Pure Chemical Industries, Ltd.) are placed in a centrifugation tube to prepare a dispersion liquid. Then, 1 g of toner is added to the dispersion liquid, and lumps of toner are loosened with a spatula or the like.

The centrifuge tube is shaken for 30 min at 350 reciprocations per minute with a shaker ("KM Shaker", manufactured by Iwaki Sangyo Co., Ltd.,). After shaking, the solution is transferred in a swing rotor glass tube (50 mL) and separated in a centrifuge (H-9R; manufactured by Kokusan Co., Ltd.) under conditions of 58.33 $S^{-1}$ for 30 min. In the glass tube after centrifugation, the toner particles are present in the uppermost layer, and the external additive is present on the aqueous solution side of the lower layer.

The toner particles in the uppermost layer are collected, filtered, and washed with 2 L of deionized water warmed to 40° C., and the washed toner particles are taken out.

Method for Measuring Normalized Intensity of Silicon Ions Present in Toner Core Particle (Normalized Intensity B)

Normally, TOF-SIMS is a surface analysis method, and data relate to about 1 nm in the depth direction. Therefore, the intensity inside the toner core particle is measured after the toner core particle is sputtered with an argon gas cluster ion beam (Ar-GCIB) and the surface is scraped.

The normalized intensity of silicon ions (m/z=28) measured under the same conditions as in the above-described "Method for Measuring Normalized Intensity of Silicon Ions Present on Toner Core Particle Surface" after performing sputtering with respect to the toner core particle under the conditions (3) described hereinbelow is taken as the value of the normalized intensity of silicon ions present inside the toner core particle.

The Ar-GCIB sputtering conditions (3) are as follows.

Accelerating voltage: 5 kV

Current: 6.5 nA

Raster size: 600 μm×600 μm

Irradiation time: 5 sec/cycle

Sputtering time: 250 sec

In addition, when the PMMA film was sputtered under the same conditions in advance and the cutting depth was confirmed, it was confirmed that 80 nm was scraped in 250 sec.

EXAMPLES

The present invention will be specifically described by the production examples and examples shown below. However, these do not limit the present invention at all. In addition, all "parts" and "%" in the following prescriptions are based on mass unless otherwise specified.

Toner Core Particle Dispersion Liquid and Production Example of Toner Core Particles Preparation of Toner Core Particle Dispersion Liquid 1 and Production of Toner Core Particle 1

A total of 11.2 parts of sodium phosphate (12-hydrate) was added to a reaction vessel containing 390.0 parts of ion-exchanged water, and the temperature was kept at 65° C. for 1.0 h while purging the reaction vessel with nitrogen. Stirring was performed at 12,000 rpm using a T. K. Homomixer (manufactured by Tokushu Kika Kogyo Co., Ltd.). While maintaining stirring, a calcium chloride aqueous solution prepared by dissolving 7.4 parts of calcium chloride (dihydrate) in 10.0 parts of ion-exchanged water was all put into the reaction vessel to prepare an aqueous medium including a dispersion stabilizer. Furthermore, 1.0 mol/L of hydrochloric acid was added to the aqueous medium in the reaction vessel to adjust the pH to 6.0, thereby preparing an aqueous medium 1.

Preparation of Polymerizable Monomer Composition 1

| | |
|---|---|
| Styrene | 60.0 parts |
| C. I. Pigment Blue 15:3 | 6.3 parts |

The above materials were put into an attritor (manufactured by Nippon Coke Kogyo Co., Ltd.), and further dispersed using zirconia particles with a diameter of 1.7 mm at 220 rpm for 5.0 h to prepare a colorant dispersion liquid 1 in which the pigment was dispersed.

Then, the following materials were added to the colorant dispersion liquid 1.

| | |
|---|---|
| Styrene | 16.0 parts |
| n-Butyl acrylate | 18.0 parts |
| Lauryl acrylate | 6.0 parts |
| 1,6-Hexanediol diacrylate | 0.5 parts |
| Polyester resin | 4.0 parts |

(Condensation product of terephthalic acid and 2 mol propylene oxide adduct of bisphenol A, weight average molecular weight Mw=10,000, acid value: 8.2 mg KOH/g)

| | |
|---|---|
| Ethylene glycol distearate | 15.0 parts |

The above materials were kept at 65° C. and uniformly dissolved and dispersed at 500 rpm by using T. K. Homomixer to prepare a polymerizable monomer composition 1.

Granulation Step

While maintaining the temperature of the aqueous medium 1 at 70° C. and the rotation speed of the stirring device at 12,500 rpm, the polymerizable monomer composition 1 was introduced into the aqueous medium 1, and 9.0 parts of t-butyl peroxypivalate was added as a polymerization initiator. The mixture was granulated for 10 min while maintaining 12,500 rpm with the stirring device.

Polymerization Step A

The high-speed stirrer was changed to a stirrer equipped with propeller stirring blades, and polymerization was carried out for 5.0 h while stirring at 200 rpm and maintaining the temperature at 70° C.

Polymerization Step B

Continuously from the polymerization step A, the temperature was further raised to 85° C. and the polymerization reaction was performed by heating for 2.0 h. Further, 0.030 parts of 3-methacryloxypropyltrimethoxysilane (S1) was added and stirred for 5 min, and then a 1 mol/L sodium hydroxide aqueous solution was added to adjust the pH to 9.0. Further, the temperature was raised to 98° C., heating was performed for 3.0 h to remove residual monomers, and the temperature was kept at 55° C. for 1.0 h while stirring was maintained.

After that, the temperature was lowered to 25° C. Ion-exchanged water was added to adjust the concentration of the toner core particles in the dispersion liquid to 20.0%, and a toner core particle dispersion liquid 1 in which the toner core particles 1 were dispersed was obtained.

Meanwhile, the toner core particle dispersion liquid 1 produced in the same manner was adjusted to pH 1.5 with 1 mol/L hydrochloric acid, stirred for 1 h, filtered while being washed with ion-exchanged water, and dried to obtain toner core particles 1. Table 1 shows the physical properties of the toner core particles 1 obtained.

Preparation of Toner Core Particle Dispersion Liquids 2 to 20 and Production Examples of Toner Core Particles 2 to 20

Toner core particle dispersion liquids 2 to 20 and toner core particles 2 to 20 were prepared in the same manner as in the preparation of toner core particle dispersion liquid 1 and the production of toner core particles 1, except that the number of parts and production conditions were changed as shown in Table 1. Table 1 shows the physical properties of the obtained toner core particles 2 to 20. The compounds shown in Table 2 were used as Si sources (Si-containing monomers) in Table 1.

Preparation of Toner Core Particle Dispersion Liquid 21 and Production Example of Toner Core Particles 21

Production Example of Silane-Modified Resin 1

The following materials were loaded into an autoclave equipped with a decompression device, a water separation device, a nitrogen gas introduction device, a temperature measurement device, and a stirring device, and the reaction was carried out at normal pressure and 200° C. for 20 h under a nitrogen atmosphere.

| | |
|---|---|
| Alcohol component: (Bisphenol A - propylene oxide 2.0 mol adduct) | 80.9 parts |
| Acid component 1 (terephthalic acid): | 16.1 parts |
| Acid component 2 (isophthalic acid): | 16.1 parts |
| Tetrabutoxytitanate: | 0.2 parts |

After that, the following materials were added and reacted at 220° C. for 3 h.

| | |
|---|---|
| Acid component 3 (trimellitic acid): | 0.4 parts |
| Tetrabutoxytitanate: | 0.3 parts |

The reaction was further carried out for 2 h under a reduced pressure of from 10 mmHg to 20 mmHg. The obtained resin was dissolved in chloroform, and the solution was dropped into ethanol to reprecipitate and filtered to obtain a polyester resin.

The carboxyl group in the obtained polyester resin and the amino group in the aminosilane were amidated to produce a silane-modified resin 1 as follows.

A total of 100.0 parts of the polyester was dissolved in 400.0 parts of N,N-dimethylacetamide, the following materials were added, and stirring was performed at room temperature for 5 h. After completion of the reaction, the solution was dropped into methanol to reprecipitate and filtered to obtain the silane-modified resin 1.

| | |
|---|---|
| Silane compound (3-aminopropyltrimethoxysilane): | 0.2 parts |
| Triethylamine: | 0.3 parts |
| Condensing agent (amidating agent): | 0.3 parts |

[DMT-mM: 4-(4,6-dimethoxy-1,3,5-triazin-2-yl)-4-methylmorpholinium chloride]

After that, using the obtained silane-modified resin 1, a toner core particle dispersion liquid 21 and toner core particles 21 were obtained in the same manner as in the preparation of toner core particle dispersion liquid 1 and the production example of toner core particles 1, except that the following materials were added to the colorant dispersion liquid 1 in the preparation of toner core particle dispersion liquid 1 and the production example of toner core particles 1.

| | |
|---|---|
| Styrene | 20.0 parts |
| n-Butyl acrylate | 20.0 parts |
| 1,6-Hexanediol diacrylate | 0.5 parts |
| Polyester resin | 3.0 parts |

(Condensation product of terephthalic acid and 2 mol propylene oxide adduct of bisphenol A, weight average molecular weight Mw=10,000, acid value: 8.2 mg KOH/g)

| | |
|---|---|
| Silane-modified resin 1 | 1.0 parts |
| Ethylene glycol distearate | 15.0 parts |

TABLE 1

| Toner core particle No. | Parts of St | Parts of n-BA | Type of monomer unit M1 | Parts of M1 | Type of wax | \|SP(M1) − SP(W)\| | Si source 1 |
|---|---|---|---|---|---|---|---|
| 1 | 76.0 | 18.0 | Lauryl acrylate | 6.0 | Ethylene glycol distearate | 0.61 | S1 |
| 2 | 78.0 | 16.0 | Lauryl acrylate | 6.0 | Ethylene glycol distearate | 0.61 | S1 |
| 3 | 76.0 | 18.0 | Lauryl acrylate | 6.0 | Ethylene glycol distearate | 0.61 | S1 |
| 4 | 76.0 | 18.0 | Lauryl acrylate | 6.0 | Ethylene glycol distearate | 0.61 | S2 |
| 5 | 76.0 | 18.0 | Lauryl acrylate | 6.0 | Ethylene glycol distearate | 0.61 | S1 |
| 6 | 76.0 | 18.0 | Lauryl acrylate | 6.0 | Ethylene glycol distearate | 0.61 | S1 |
| 7 | 76.0 | 18.0 | Lauryl acrylate | 6.0 | Ethylene glycol distearate | 0.61 | S1 |
| 8 | 78.0 | 16.0 | Lauryl acrylate | 6.0 | Ethylene glycol distearate | 0.61 | S1 |
| 9 | 73.0 | 21.0 | Lauryl acrylate | 6.0 | Ethylene glycol distearate | 0.61 | S3 |
| 10 | 73.0 | 21.0 | Lauryl acrylate | 6.0 | Ethylene glycol distearate | 0.61 | S1 |
| 11 | 78.0 | 16.0 | Lauryl acrylate | 6.0 | Ethylene glycol distearate | 0.61 | S1 |

TABLE 1-continued

| | | | | | | | |
|---|---|---|---|---|---|---|---|
| 12 | 78.0 | 16.0 | Lauryl acrylate | 6.0 | Ethylene glycol distearate | 0.61 | S2 |
| 13 | 78.0 | 16.0 | Lauryl acrylate | 6.0 | Ethylene glycol distearate | 0.61 | S1 |
| 14 | 76.0 | 18.0 | Lauryl acrylate | 6.0 | Ethylene glycol distearate | 0.61 | S1 |
| 15 | 76.0 | 18.0 | Lauryl acrylate | 6.0 | HNP51 | | S1 |
| 16 | 76.0 | 18.0 | Lauryl acrylate | 6.0 | Hexanediol dimyristate | 0.54 | S1 |
| 17 | 76.0 | 18.0 | Lauryl acrylate | 6.0 | Hexanediol dibehenate | 0.74 | S1 |
| 18 | 76.0 | 18.0 | Behenyl acrylate | 6.0 | Ethylene glycol distearate | 0.15 | S1 |
| 19 | 76.0 | 18.0 | Dotriacontyl acrylate | 6.0 | Ethylene glycol distearate | 0.05 | S1 |
| 20 | 76.0 | 18.0 | Lauryl acrylate | 6.0 | Ethylene glycol distearate | 0.61 | |
| 21 | 82.0 | 18.0 | | | Ethylene glycol distearate | | Silane-modified resin 1 |

| Toner core particle | Parts of | Addition step | | Particle | Normalized intensity of silicon ions | |
|---|---|---|---|---|---|---|
| No. | Si source 1 | of Si source 1 | Waiting time | diameter μm | *1 | *2 |
| 1 | 0.030 | Polymerization step B | 5 min | 7.1 | 8.36.E−03 | 1.65.E−04 |
| 2 | 0.060 | Polymerization step B | 5 min | 7.1 | 9.93.E−03 | 4.50.E−04 |
| 3 | 0.060 | Polymerization step B | 5 min | 6.9 | 9.86.E−03 | 5.72.E−04 |
| 4 | 0.400 | Polymerization step B | 60 min | 7.3 | 6.99.E−03 | 6.82.E−04 |
| 5 | 0.005 | Polymerization step B | 5 min | 7.1 | 7.11.E−04 | 5.32.E−04 |
| 6 | 0.010 | Polymerization step B | 5 min | 7.2 | 8.46.E−04 | 5.94.E−04 |
| 7 | 0.120 | Polymerization step B | 5 min | 7.1 | 3.95.E−02 | 6.89.E−04 |
| 8 | 0.200 | Polymerization step B | 5 min | 6.9 | 4.51.E−02 | 7.11.E−04 |
| 9 | 0.030 | Polymerization step B | 5 min | 6.9 | 1.78.E−03 | 2.38.E−04 |
| 10 | 0.030 | Polymerization step B | 5 min | 7.0 | 7.01.E−03 | 4.19.E−04 |
| 11 | 0.120 | Polymerization step B | 5 min | 7.0 | 3.53.E−02 | 5.62.E−04 |
| 12 | 0.400 | Polymerization step B | 180 min | 7.0 | 3.18.E−02 | 8.32.E−04 |
| 13 | 0.010 | Polymerization step B | 5 min | 7.1 | 8.11.E−04 | 3.40.E−04 |
| 14 | 0.005 | Polymerization step B | 5 min | 7.2 | 7.21.E−04 | 3.27.E−04 |
| 15 | 0.030 | Polymerization step B | 5 min | 7.1 | 6.88.E−03 | 2.98.E−04 |
| 16 | 0.030 | Polymerization step B | 5 min | 6.8 | 7.35.E−03 | 3.39.E−04 |
| 17 | 0.030 | Polymerization step B | 5 min | 7.0 | 9.23.E−03 | 4.61.E−04 |
| 18 | 0.030 | Polymerization step B | 5 min | 7.0 | 7.70.E−03 | 3.37.E−04 |
| 19 | 0.030 | Polymerization step B | 5 min | 7.1 | 9.91.E−03 | 2.06.E−04 |
| 20 | | Polymerization step B | 5 min | 7.0 | 2.10.E−04 | 2.42.E−04 |
| 21 | 1.000 | Polymerization step B | 5 min | 7.3 | 1.52.E−03 | 6.83.E−04 |

In the table, St indicates styrene and n-BA indicates n-butyl acrylate. The waiting time indicates the waiting time from the addition of the Si source until the pH rises. The particle diameter indicates the weight-average particle diameter. *1 indicates the normalized intensity A of the toner core particles measured by a time-of-flight secondary ion mass spectrometer (TOF-SIMS). *2 indicates the normalized intensity B after the toner core particles are sputtered under the above conditions (3). HNP51 is paraffin wax (Nippon Seiro Co., Ltd.).

Regarding the normalized intensity, for example, "8.36.E-03" indicates "$8.36\times10^{-3}$".

TABLE 2

| Monomer type | Silane compound source material |
|---|---|
| S1 | 3-methacryloxypropyltrimethoxysilane |
| S2 | 3-methacryloxypropyltris(trimethylsiloxy)silane |
| S3 | 3-methacryloxypropylmethyldimethoxysilane |

Preparation of Monomer Hydrolysate 1

A liquid mixture of 60 parts of ion-exchanged water adjusted to pH=4.0 by adding 1 mol/L hydrochloric acid and 40 parts of methyltrimethoxysilane was mixed with a stirrer until a uniform phase was obtained, thereby obtaining a monomer hydrolysate 1.

Preparation of Monomer Hydrolysate 2

A liquid mixture of 60 parts of ion-exchanged water adjusted to pH=4.0 by adding 1 mol/L hydrochloric acid and 40 parts of methyltriethoxysilane was mixed with a stirrer until a uniform phase was obtained, thereby obtaining a monomer hydrolysate 2.

Production Example of Toner Particle 1

After heating the toner core particle dispersion 1 to 55° C., the pH was adjusted to 8.0 (first pH adjustment), 20 parts of the monomer hydrolysate 1 was added while mixing using a propeller stirring blade and stirring was continued for 10 min (first retention time). Then, a 1 mol/L sodium hydroxide aqueous solution was added to adjust the pH to 11.0 (second pH adjustment) and stirring was continued for 3 h.

After adjusting the pH to 1.5 with 1 mol/L hydrochloric acid and stirring for 1 hour, filtering while washing with ion-exchanged water and drying were performed, and the resulting finely pulverized powder was classified with a multi-division classifier using the Coanda effect to obtain toner particle 1.

Production Examples of Toner Particles 2 to 23

Toner particles 2 to 23 were obtained in the same manner as in the production example of toner particle 1, except that the type of toner core particles, the monomer hydrolysate, and the production conditions were changed as shown in Table 3.

Production Example of Comparative Toner 1

Production Example of Organosilicon Polymer Particle 1

First Step

A total of 360.0 parts of water was put into a reaction vessel equipped with a thermometer and a stirrer, and 15.0 parts of hydrochloric acid with a concentration of 5.0% by mass was added to obtain a uniform solution. A total of 60.0 parts of methyltrimethoxysilane and 73.0 parts of tetraethoxysilane were added while stirring the solution at a temperature of 25° C., and after stirring for 5 h, filtration was performed to obtain a transparent reaction solution including a silanol compound or a partial condensate thereof.

Second Step

A total of 540.0 parts of water was put into a reaction vessel equipped with a thermometer, a stirrer, and a dropping device, and 17.0 parts of ammonia water with a concentration of 10.0% by mass was added to obtain a uniform solution. While stirring the obtained solution at a temperature of 35° C., 100 parts of the reaction liquid obtained in the first step was added dropwise over 0.5 h, followed by stirring for 6 h to obtain a suspension. The resulting suspension was loaded in a centrifuge to sediment fine particles, which were taken out and dried in a dryer at a temperature of 200° C. for 24 h to obtain organosilicon polymer particle 1 composed of polyalkylsilsesquioxane. The resulting organosilicon polymer particle 1 had a number-average particle diameter of 95 nm as determined by scanning electron microscope observation.

After that, the following materials were put into a Henschel mixer ("FM-75 type", manufactured by Mitsui Miike Kakoki Co., Ltd.), the peripheral speed of the rotary blade was set to 35 m/sec, and mixing was performed for a mixing time of 5 min to cause the adhesion of the organosilicon polymer particle 1 to the surface of toner core particle 20 and obtain an externally added toner.

| | |
|---|---|
| Toner core particle 20 classified using a multi-division classifier: | 100.0 parts |
| Organosilicon polymer particle 1: | 7.0 parts |

Figure 3:
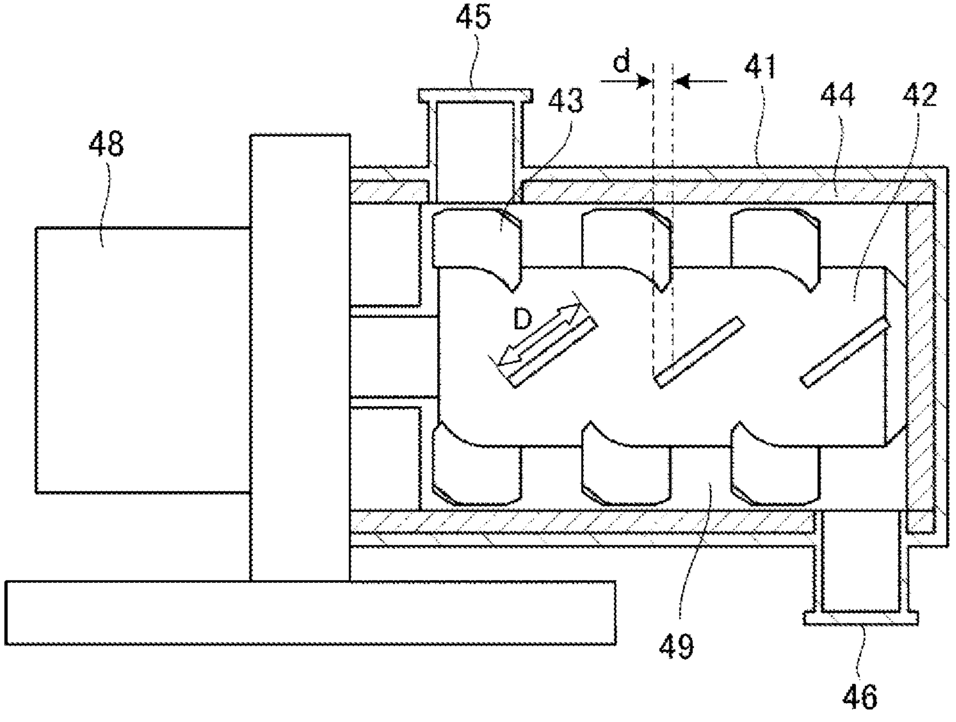
FIG. 3 is a schematic diagram of a mixing processing apparatus.

Subsequently, the externally added toner was put into an inlet 45 of a mixing processing apparatus shown in FIG. 3 that had the below-described configuration, and heating treatment was performed. In the mixing processing device, the diameter of the inner peripheral portion of a main body casing 41 was 130 mm, the volume of a processing space 49 was $2.0\times10^{-3}$ $m^3$, the rated power of a drive unit 48 was 5.5 kW, and the shapes of a rotation body 42 and stirring members 43 were as shown in FIG. 3. The overlapping width d of the stirring members in FIG. 3 was set to 0.25D with respect to the maximum width D of the stirring member 43, and the clearance between the stirring member 43 and the inner circumference of the main body casing 41 was set to 3.0 mm. The temperature was adjusted by flowing a cooling/heating medium in a jacket 44. Hot water was passed through the jacket so that the temperature inside the processing apparatus was 55° C. Mixing was started after the temperature stabilized at 55° C., and the temperature was adjusted to maintain 55° C.±1° C. during mixing.

After adding the externally added toner, heating treatment was performed for 10 min while adjusting the peripheral speed of the outermost end of the stirring member 43 so that the power of the drive unit 48 was constant at $1.5\times10^{-2}$ W/g (rotation speed of the drive unit 48: 150 rpm). After completion of the heating treatment, the toner was discharged from an outlet 46 and sieved through a mesh having an opening of 75 μm to obtain comparative toner 1.

Production Example of Comparative Toner 2

Organosilicon polymer particle 2 was obtained by using 133.0 parts of methyltrimethoxysilane as the silane compound introduced in the first step in the production step of comparative toner 1. Thereafter, comparative toner 2 was obtained in the same manner as in the production example of comparative toner 1, except that the materials to be charged were changed as follows.

| Toner core particle 1 classified using a multi-division classifier: | 100.0 parts |
|---|---|
| Organosilicon polymer particle 2: | 7.0 parts |

The obtained organosilicon polymer particle 2 had a number-average particle diameter of 101 nm as determined by scanning electron microscope observation.

Production Example of Comparative Toner 3

A comparative toner 3 was obtained in the same manner as in the production example of the comparative toner 1, except that the toner core particle 20 were replaced with the toner core particle 1.

Production Example of Comparative Toner 4

Preparation of Resin Fine Particle Dispersion Liquid 1

| Bisphenol A propylene oxide 2 mol adduct | 500 parts |
|---|---|
| Terephthalic acid | 154 parts |
| Fumaric acid | 45 parts |
| Tin octoate | 2 parts |

The above materials were put into a reaction vessel equipped with a nitrogen inlet tube, a dehydration tube, a stirrer and a thermocouple, the polycondensation reaction was performed at a temperature of 230° C. for 8 h, and further the polycondensation reaction was continued at 8 kPa for 1 h. After that, the polyester resin was formed by cooling to 160° C.

Then, 10 parts of acrylic acid was added and mixed at a temperature of 160° C., and the temperature was maintained for 15 min.

| Styrene | 142 parts |
|---|---|
| n-Butyl acrylate | 35 parts |

-continued

| Polymerization initiator (di-t-butyl peroxide) | 10 parts |
|---|---|

After that, the mixture of the above materials was added dropwise from a dropping funnel over 1 h, and an addition polymerization reaction was carried out over 1 h while maintaining the temperature at 160° C. Thereafter, the temperature was raised to 200° C. and maintained at 10 kPa for 1 h to obtain polymer 1.

A total of 100 parts of the obtained polymer 1 was dissolved in 200.0 parts of methyl ethyl ketone, 1.0 mol/L potassium hydroxide aqueous solution was slowly added, and after stirring for 10 min, 500.0 parts of ion-exchanged water was slowly added dropwise to induce emulsification.

The resulting emulsion was distilled under reduced pressure to remove the solvent, and ion-exchanged water was added to adjust the resin concentration to 20%, thereby obtaining a resin particle dispersion liquid 1.

After heating the toner core particle dispersion liquid 1 to 80° C., a 1.0 mol/L potassium hydroxide aqueous solution (pH adjuster) was added with stirring to adjust the pH to 9.0, and then the resin particle dispersion 1 was added under stirring at 200 rpm and stirring was continued for 1 h while maintaining the temperature at 80° C. Then, after cooling to 20° C., the pH was adjusted to 1.5 with 1 mol/L hydrochloric acid and stirring was performed for 1 h. After that, filtration was performed while washing with ion-exchanged water, followed by drying. The resulting finely pulverized powder was thereafter classified with a multi-division classifier using the Coanda effect to obtain a comparative toner 4. The Young's modulus, I, H, etc. in Table 3 are physical properties in a state of resin particles.

Production Examples of Comparative Toners 5 to 7

Comparative toners 5 to 7 were obtained in the same manner as in the production example of toner particles 1, except that the number of parts and production conditions were changed as shown in Table 3.

TABLE 3

| Toner particle No. | Toner core particle | Monomer hydrolysate No. | Parts | First pH adjustment | First holding time | Second pH adjustment | Young's modulus E1 (GPa) | E2 (GPa) | E1/E2 |
|---|---|---|---|---|---|---|---|---|---|
| 1 | Toner core partide 1 | 1 | 20 | 8.0 | 10 min | 11.0 | 2.57 | 0.69 | 3.7 |
| 2 | Toner core partide 2 | 1 | 20 | 9.0 | 30 min | 10.5 | 3.81 | 0.91 | 4.2 |
| 3 | Toner core particle 1 | 1 | 20 | 7.8 | 5 min | 11.0 | 1.05 | 0.69 | 1.5 |
| 4 | Toner core particle 1 | 2 | 20 | 8.0 | 10 min | 11.0 | 2.19 | 0.69 | 3.2 |
| 5 | Toner core particle 3 | 1 | 20 | 9.0 | 30 min | 10.5 | 3.62 | 0.75 | 4.8 |
| 6 | Toner core particle 4 | 1 | 30 | 7.8 | 5 min | 11.0 | 1.11 | 1.21 | 0.9 |
| 7 | Toner core particle 5 | 1 | 20 | 8.0 | 10 min | 11.0 | 2.52 | 0.56 | 4.5 |
| 8 | Toner core particle 6 | 1 | 20 | 8.0 | 10 min | 11.0 | 2.41 | 0.60 | 4.0 |
| 9 | Toner core particle 7 | 1 | 30 | 8.0 | 10 min | 11.0 | 2.12 | 0.89 | 2.4 |
| 10 | Toner core particle 8 | 1 | 30 | 8.0 | 10 min | 11.0 | 2.01 | 0.96 | 2.1 |
| 11 | Toner core particle 2 | 1 | 20 | 8.0 | 10 min | 11.0 | 2.67 | 0.85 | 3.1 |
| 12 | Toner core particle 9 | 1 | 20 | 8.5 | 5 min | 11.0 | 1.82 | 0.43 | 4.2 |
| 13 | Toner core particle 10 | 1 | 20 | 8.0 | 10 min | 11.0 | 2.11 | 0.51 | 4.1 |
| 14 | Toner core particle 11 | 1 | 30 | 8.0 | 10 min | 11.0 | 2.99 | 0.98 | 3.1 |

TABLE 3-continued

| | | | | | | | | | |
|---|---|---|---|---|---|---|---|---|---|
| 15 | Toner core particle 12 | 1 | 30 | 8.0 | 10 min | 11.0 | 2.74 | 1.21 | 2.3 |
| 16 | Toner core particle 13 | 1 | 20 | 9.0 | 30 min | 11.0 | 3.51 | 0.80 | 4.4 |
| 17 | Toner core particle 14 | 1 | 20 | 7.8 | 5 min | 11.0 | 1.18 | 0.52 | 2.3 |
| 18 | Toner core particle 7 | 1 | 10 | 8.0 | 10 min | 11.0 | 1.99 | 0.89 | 2.2 |
| 19 | Toner core particle 15 | 1 | 20 | 8.0 | 10 min | 11.0 | 2.59 | 0.61 | 4.2 |
| 20 | Toner core particle 16 | 1 | 20 | 8.0 | 10 min | 11.0 | 2.59 | 0.61 | 4.2 |
| 21 | Toner core particle 17 | 1 | 20 | 8.0 | 10 min | 11.0 | 2.41 | 0.70 | 3.4 |
| 22 | Toner core particle 18 | 1 | 20 | 8.0 | 10 min | 11.0 | 2.17 | 0.55 | 3.9 |
| 23 | Toner core particle 19 | 1 | 20 | 8.0 | 10 min | 11.0 | 2.46 | 0.59 | 4.2 |
| Comparison 1 | Toner core particle 20 | | | | | | 1.40 | 0.49 | 2.9 |
| Comparison 2 | Toner core particle 1 | | | | | | 0.95 | 0.69 | 1.4 |
| Comparison 3 | Toner core particle 1 | | | | | | 1.31 | 0.69 | 1.9 |
| Comparison 4 | Toner core particle 1 | | | | | | 2.01 | 0.69 | 2.9 |
| Comparison 5 | Toner core particle 21 | 1 | 30 | 7.0 | 60 min | 9.5 | 4.99 | 0.97 | 5.1 |
| Comparison 6 | Toner core particle 1 | 1 | 20 | 7.0 | 60 min | 9.5 | 4.80 | 0.69 | 6.9 |
| Comparison 7 | Toner core particle 1 | 1 | 20 | 11.0 | | | 4.01 | 0.69 | 5.8 |

| | Shape parameters | | | | | |
|---|---|---|---|---|---|---|
| Toner particle No. | I (nm) | W (nm) | H (nm) | Coverage (%) | I/W | W/H |
| 1 | 1.0 | 109 | 32 | 51 | 0.009 | 3.4 |
| 2 | 0.8 | 111 | 35 | 45 | 0.007 | 3.2 |
| 3 | 1.1 | 140 | 38 | 46 | 0.008 | 3.7 |
| 4 | 0.9 | 112 | 36 | 46 | 0.008 | 3.1 |
| 5 | 0.9 | 101 | 36 | 50 | 0.009 | 2.8 |
| 6 | 0.7 | 189 | 60 | 68 | 0.004 | 3.2 |
| 7 | 0.9 | 81 | 39 | 50 | 0.011 | 2.1 |
| 8 | 0.6 | 86 | 42 | 49 | 0.007 | 2.0 |
| 9 | 0.8 | 180 | 58 | 58 | 0.004 | 3.1 |
| 10 | 0.9 | 201 | 55 | 62 | 0.004 | 3.7 |
| 11 | 1.1 | 102 | 33 | 51 | 0.011 | 3.1 |
| 12 | 1.0 | 96 | 31 | 47 | 0.010 | 3.1 |
| 13 | 0.7 | 105 | 33 | 48 | 0.007 | 3.2 |
| 14 | 0.8 | 198 | 61 | 61 | 0.004 | 3.2 |
| 15 | 1.0 | 219 | 71 | 70 | 0.005 | 3.1 |
| 16 | 0.8 | 77 | 42 | 41 | 0.010 | 1.8 |
| 17 | 1.0 | 61 | 45 | 36 | 0.016 | 1.4 |
| 18 | 0.9 | 101 | 25 | 41 | 0.009 | 4.0 |
| 19 | 1.0 | 109 | 35 | 48 | 0.009 | 3.1 |
| 20 | 1.0 | 109 | 35 | 51 | 0.009 | 3.1 |
| 21 | 1.1 | 121 | 38 | 49 | 0.009 | 3.2 |
| 22 | 0.9 | 113 | 33 | 49 | 0.008 | 3.4 |
| 23 | 0.9 | 108 | 31 | 50 | 0.008 | 3.5 |
| Comparison 1 | 18.1 | 57 | 80 | 46 | 0.315 | 0.7 |
| Comparison 2 | 17.2 | 55 | 84 | 44 | 0.313 | 0.7 |
| Comparison 3 | 20.5 | 62 | 77 | 46 | 0.331 | 0.8 |
| Comparison 4 | 0.6 | 231 | 28 | | 0.003 | 8.3 |
| Comparison 5 | 0.9 | 161 | 36 | 67 | 0.006 | 4.5 |
| Comparison 6 | 0.7 | 75 | 42 | 64 | 0.009 | 1.8 |
| Comparison 7 | 1.0 | 62 | 44 | 41 | 0.016 | 1.4 |

Example 1

First, as an electrophotographic apparatus, HP Color Laser jet Enterprise M653dn was modified as an evaluation machine, the process speed was set to 340 mm/s, and the contact pressure of the regulating member against the toner carrying member was set to 80% of the default setting.

Next, a process cartridge obtained by filling the cartridge for HP Color Laser jet Enterprise M653dn with the toner 1 and the electrophotographic apparatus were allowed to stand in a high-temperature and high-humidity environment (35° C./85% RH) for 48 h in order to adapt to the measurement environment.

Evaluation of Initial Charge Quantity

Figure 4:
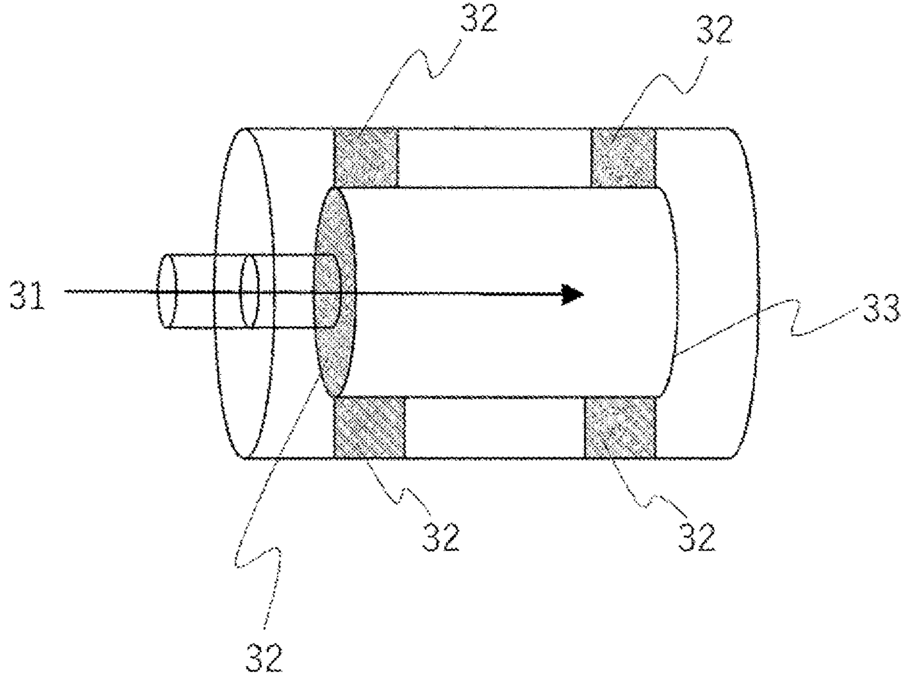
FIG. 4 is a schematic diagram of a Faraday cage.

A total of 10 solid images were output with the modified HP Color Laser jet Enterprise M653dn allowed to stand in the above environment. The machine was forcibly stopped during the output of the tenth sheet, and the toner charge quantity on the carrying member immediately after passing through the regulating member was measured. A Faraday cage shown in perspective in FIG. 4 was used to measure the charge quantity on the carrier member.

The inside (right side of the drawing) was decompressed so that the toner on the carrying member was sucked in, and a toner filter 33 was provided to collect the toner. In addition, reference numeral 31 stands for a suction part, and reference numeral 32 stands for a holder. From the mass M of the collected toner and the charge Q directly measured with a coulomb meter, the charge amount Q/M (μC/g) per unit mass was calculated and assigned with the following ranks as the toner charge quantity (Q/M). In this evaluation, the higher the numerical value, the higher the charge quantity. When the evaluation was A or B, it was determined to be good. Table 4 shows the evaluation results.

A: The charge quantity on the developing roller is 50 μC/g or more

B: The charge quantity on the developing roller is from 40 μC/g to 49 μC/g

C: The charge quantity on the developing roller is from 30 μC/g to 39 μC/g

D: The charge quantity on the developing roller is less than 30 μC/g

Evaluation of Charge Retention Property

A total of 10 sheets of all black images were output with a modified HP Color Laser jet Enterprise M653dn allowed to stand in the above environment, the machine was forcibly stopped during output, and the toner charge quantity accumulated on the intermediate transfer belt was measured. The charge quantity on the intermediate transfer belt was measured in the same manner as in the evaluation of the initial charge quantity.

From the mass M (g) of the collected toner and the charge Q (μC) directly measured with a coulomb meter, the charge amount (μC/g) per unit mass was calculated and taken as the toner charge quantity (Q/M). The charge retention property was evaluated by comparing the charge quantity on the developing roller in the evaluation of the initial charge quantity and the charge quantity on the intermediate transfer belt in this evaluation.

In this evaluation, the higher was the charge retention property, the less charge leaked in the LBP process, and the higher the charge quantity was retained. That is, the smaller the numerical value, the better the charge retention property. When the evaluation was A or B, it was determined to be good. Table 4 shows the evaluation results.

A: The charge quantity difference between the developing roller and the intermediate transfer belt is 3 μC/g or less.

B: The charge quantity difference between the developing roller and the intermediate transfer belt is more than 3 μC/g and 6 μC/g or less.

C: The charge quantity difference between the developing roller and the intermediate transfer belt is more than 6 μC/g and 10 μC/g or less.

D: The charge quantity difference between the developing roller and the intermediate-transfer belt is more than 10 μC/g.

Evaluation of Durability Charge Retention Property

In a high-temperature and high-humidity environment (30C/80% RH), 25,000 sheets were printed in an intermittent/continuous use mode in which two sheets with an image of letter E were output every 4 sec so that the print percentage was 0.5%. As the durability evaluation paper, business 4200 (manufactured by Xerox Corp.) having a basis weight of 75 $g/m^2$ was used.

After the durability, the charge quantity on the developing roller was measured in the same manner as in the evaluation of the initial charge quantity. Durability charge retention property was evaluated by comparing the initial charge quantity with the charge quantity after durability in this evaluation. When the evaluation was A to C, it was determined to be good. Table 4 shows the evaluation results.

A: The charge quantity difference between the initial charge quantity and the charge quantity after durability is 3 μC/g or less B: The charge quantity difference between the initial charge quantity and the charge quantity after durability is more than 3 μC/g and 6 μC/g or less C: The charge quantity difference between the initial charge quantity and the charge quantity after durability is more than 6 μC/g and less than 10 μC/g D: The charge quantity difference between the initial charge quantity and the charge quantity after durability is 10 μC/g or more and less than 15 μC/g E: The charge quantity difference between the initial charge quantity and the charge quantity after durability is 15 μC/g or more.

Light-Load Fixing Gloss Uniformity Evaluation

The modified machine of HP Color Laser jet Enterprise M653dn was modified so that the fixing nip pressure was 80% of the default setting to obtain an electrophotographic apparatus for evaluation that was used for gloss uniformity testing upon modification to obtain a fixing temperature of 180° C.

Under a normal temperature and normal humidity environment (23° C./50% RH), the toner amount laid on the paper was adjusted to 0.50 $mg/cm^2$, and an image was formed on A4 with a landscape orientation at a print percentage of 100%. As the evaluation paper, business 4200 (manufactured by Xerox Corp.) having a basis weight of 75 $g/m^2$ was used. The obtained fixed image was divided vertically into 3 sections and horizontally into 7 sections (a total of 21 sections), the gloss was measured at each section, a difference (gloss difference) between the maximum value and minimum value of these 21 measurements was found, and evaluation was performed based on the following criteria. The gloss measurement was performed using PG-3D (manufactured by Nippon Denshoku Industries Co., Ltd.). When the evaluation was A to C, it was determined to be good. Table 4 shows the evaluation results.

Evaluation Criteria for Gloss Uniformity

A: less than 1.0

B: 1.0 or more and less than 2.0

C: 2.0 or more and less than 3.0

D: 3.0 or more

Fine Dot Reproducibility

Under a high-temperature and high-humidity environment (H/H) (35° C., 85% RH), the image quality was evaluated using the modified HP Color Laser jet Enterprise M653dn. As the evaluation paper, business 4200 (manufactured by Xerox Corp.) having a basis weight of 75 g/$m^2$ was used. An image having a 259 mm (length)×196 mm halftone portion formed of isolated dots was output with a tip margin of 10 mm and a horizontal line interval of 10 mm (dot print percentage 15%). Then, the 20,000-th image was evaluated as follows.

The evaluation was performed by randomly observing 100 isolated dots of the image using a loupe, measuring the minor axis and major axis of each dot, and obtaining the ratio of the major axis to the minor axis (the value obtained by dividing the major axis by the minor axis). Then, among 100 isolated dots, the maximum value of the ratio of the major axis to the minor axis was used, and the evaluation was performed according to the following evaluation criteria. When the evaluation was A or B, it was determined to be good. Table 4 shows the evaluation results.

Evaluation Criteria

A. The maximum value of the ratio of the major axis to the minor axis is less than 1.10

B. The maximum value of the ratio of the major axis to the minor axis is 1.10 or more and less than 1.20

C. The maximum value of the ratio of the major axis to the minor axis is 1.20 or more and less than 1.30

D. The maximum value of the ratio of the major axis to the minor axis is 1.30 or more

TABLE 4

| | | Initial charging quantity | | Charge retention property | | | Durability charge retention property |
|---|---|---|---|---|---|---|---|
| | Toner | Initial triboelectric charge on Drol (μC/g) | Evaluation | Triboelectric charge on ITB belt (μC/g) | Difference in charge quantity (μC/g) | Evaluation | Triboelectric charge on Drol after durability (μC/g) |
| Example 1 | Toner particle 1 | 53 | A | 52 | 1 | A | 52 |
| Example 2 | Toner particle 2 | 49 | B | 45 | 4 | B | 47 |
| Example 3 | Toner particle 3 | 50 | A | 45 | 5 | B | 46 |
| Example 4 | Toner particle 4 | 50 | A | 48 | 2 | A | 48 |
| Example 5 | Toner particle 5 | 47 | B | 46 | 1 | A | 40 |
| Example 6 | Toner particle 6 | 41 | B | 35 | 6 | B | 32 |
| Example 7 | Toner particle 7 | 45 | B | 40 | 5 | B | 36 |
| Example 8 | Toner particle 8 | 47 | B | 41 | 6 | B | 41 |
| Example 9 | Toner particle 9 | 57 | A | 52 | 5 | B | 55 |
| Example 10 | Toner particle 10 | 59 | A | 53 | 6 | B | 58 |
| Example 11 | Toner particle 11 | 52 | A | 51 | 1 | A | 51 |
| Example 12 | Toner particle 12 | 54 | A | 52 | 2 | A | 48 |
| Example 13 | Toner particle 13 | 52 | A | 51 | 1 | A | 49 |
| Example 14 | Toner particle 14 | 49 | B | 46 | 3 | A | 46 |
| Example 15 | Toner particle 15 | 44 | B | 40 | 4 | B | 41 |
| Example 16 | Toner particle 16 | 41 | B | 36 | 5 | B | 33 |
| Example 17 | Toner particle 17 | 40 | B | 36 | 4 | B | 31 |
| Example 18 | Toner particle 18 | 57 | A | 51 | 6 | B | 56 |
| Example 19 | Toner particle 19 | 51 | A | 48 | 3 | A | 49 |
| Example 20 | Toner particle 20 | 54 | A | 53 | 1 | A | 53 |
| Example 21 | Toner particle 21 | 51 | A | 49 | 2 | A | 48 |
| Example 22 | Toner particle 22 | 54 | A | 52 | 2 | A | 52 |
| Example 23 | Toner particle 23 | 52 | A | 50 | 2 | A | 49 |
| Comparative Example 1 | Comparative toner particle 1 | 15 | D | 11 | 4 | B | 7 |
| Comparative Example 2 | Comparative toner particle 2 | 22 | D | 11 | 11 | D | 14 |
| Comparative Example 3 | Comparative toner particle 3 | 19 | D | 14 | 5 | B | 8 |
| Comparative Example 4 | Comparative toner particle 4 | 16 | D | 12 | 4 | B | 8 |
| Comparative Example 5 | Comparative toner particle 5 | 29 | D | 20 | 9 | B | 25 |
| Comparative Example 6 | Comparative toner particle 6 | 26 | D | 21 | 5 | B | 23 |
| Comparative Example 7 | Comparative toner particle 7 | 29 | D | 26 | 3 | A | 13 |

| | Durability charge retention property | | Light-load fixing gloss uniformity | | Light-load process dot reproducibility | |
|---|---|---|---|---|---|---|
| | Difference in charge quantity after durability (μC/g) | Evaluation | Gloss difference | Evaluation | Maximum value of ratio of major axis to minor axis | Evaluation |
| Example 1 | 1 | A | 0.8 | A | 1.01 | A |
| Example 2 | 2 | A | 1.4 | B | 1.12 | B |

TABLE 4-continued

| | | | | | | |
|---|---|---|---|---|---|---|
| Example 3 | 4 | B | 0.5 | A | 1.14 | B |
| Example 4 | 2 | A | 0.7 | A | 1.02 | A |
| Example 5 | 7 | C | 1.2 | B | 1.13 | B |
| Example 6 | 9 | C | 1.8 | B | 1.18 | B |
| Example 7 | 9 | C | 0.9 | A | 1.16 | B |
| Example 8 | 6 | B | 0.7 | A | 1.18 | B |
| Example 9 | 2 | A | 1.9 | 8 | 1.09 | A |
| Example 10 | 1 | A | 1.9 | B | 1.09 | A |
| Example 11 | 1 | A | 0.9 | A | 1.02 | A |
| Example 12 | 6 | B | 0.5 | A | 1.05 | A |
| Example 13 | 3 | A | 0.4 | A | 1.01 | A |
| Example 14 | 3 | A | 1.7 | B | 1.15 | B |
| Example 15 | 3 | A | 1.8 | B | 1.18 | B |
| Example 16 | 8 | C | 1.7 | B | 1.18 | B |
| Example 17 | 9 | C | 0.6 | A | 1.18 | B |
| Example 18 | 1 | A | 1.9 | B | 1.17 | B |
| Example 19 | 2 | A | 2.4 | C | 1.08 | A |
| Example 20 | 1 | A | 0.8 | A | 1.03 | A |
| Example 21 | 3 | A | 1.5 | B | 1.03 | A |
| Example 22 | 2 | A | 0.5 | A | 1.02 | A |
| Example 23 | 3 | A | 0.4 | A | 1.02 | A |
| Comparative Example 1 | 8 | C | 2.9 | C | 1.36 | D |
| Comparative Example 2 | 8 | C | 2.8 | C | 1.35 | D |
| Comparative Example 3 | 11 | D | 2.6 | C | 1.31 | D |
| Comparative Example 4 | 8 | C | 2.6 | C | 1.35 | D |
| Comparative Example 5 | 4 | B | 4.0 | D | 1.30 | D |
| Comparative Example 6 | 3 | B | 2.3 | C | 1.27 | C |
| Comparative Example 7 | 16 | E | 2.1 | C | 1.25 | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-113832, filed Jul. 15, 2022, which is hereby incorporated by reference herein in its entirety.

What is claimed is:

1. A toner, comprising:

a toner particle comprising a binder resin and a wax;

the toner particle having a toner core particle comprising an organosilicon compound segment, and having a protrusion on a surface of the toner core particle; and the protrusion comprising an organosilicon polymer, wherein $I/W \leq 0.050$ and E1 is 1.00 to 3.90 GPa where in a horizontal image obtained in cross-sectional observation of the toner particle with a transmission electron microscope by drawing a line along a circumference of the surface of the toner core particle and converting based on the line along the circumference, W (nm) is the length of a reference line defined by a line segment connecting both ends of an interface between the toner core particle and the protrusion, I (nm) is a maximum penetration depth defined by a maximum length of the protrusion in the toner core particle direction from the reference line in the normal direction of the reference line, and E1 is a Young's modulus of the protrusion calculated by Hertz's contact theory, and a normalized intensity A is $8.00\times10^{-4}$ to $4.00\times10^{-2}$ and a normalized intensity B is $7.99\times10^{-4}$ or less, where normalized intensity A is a normalized intensity of silicon ions defined by (ionic intensity of silicon ion (m/z=28))/(total ionic intensity at m/z=0.5 to 1850) obtained by measuring the toner core particle with a time-of-flight secondary ion mass spectrometer, and normalized intensity B is a normalized intensity of silicon ions when the toner core particle is sputtered with an argon gas cluster ion beam for 250 sec under conditions of 5 kV acceleration voltage, 6.5 nA current, 600 $\mu m^2$ raster size and 5 sec/cycle irradiation time.

2. The toner according to claim 1, wherein (E1/E2) is 1.0 to 4.5 where E2 is the Young's modulus of the surface of the toner core particle.

3. The toner according to claim 2, wherein E2 is 0.50 GPa or more and less than 1.00 GPa.

4. The toner according to claim 1, wherein normalized intensity A is $8.00\times10^{-4}$ to $1.00\times10^{-2}$, and normalized intensity B is $6.99\times10^{-4}$ or less.

5. The toner according to claim 1, wherein 30 to 70% of the area of the toner core particle surface is covered with the protrusions.

6. The toner according to claim 1, wherein W is 80 to 250 nm, and the organosilicon polymer has a structure represented by $R—SiO_{3/2}$ when R represents a hydrocarbon group having 1 to 6 carbon atoms or an aryl group.

7. The toner according to claim 1, wherein H is 25 to 100 nm and W/H is 1.5 to 3.7 where H is a number-average height of the protrusions measured with a scanning probe microscope.

8. The toner according to claim 1, wherein the wax is an ester wax comprising an ester compound of an aliphatic diol having 2 to 6 carbon atoms and an aliphatic monocarboxylic acid having 14 to 22 carbon atoms.

9. The toner according to claim 8, wherein the binder resin has a monomer unit M1, and $|SP(M1)-SP(W)|$ of the binder resin is 1.00 or less, where SP (M1) is an SP value of the monomer unit M1 in the Fedors method and SP (W) is an SP value of the ester wax.

10. The toner according to claim 9, wherein monomer unit M1 has a structure represented by formula (4),

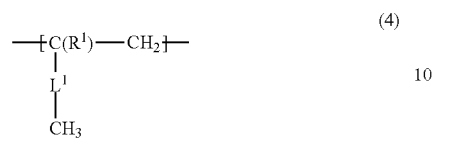

(4)

when $L^1$ represents $—COO(CH_2)_n—$, n is an integer of 11 to 31, the carbonyl of $L^1$ is bonded to a carbon atom of the main chain, and $R^1$ represents a hydrogen atom or a methyl group.

* * * * *